US012741198B2

(12) United States Patent
Hu et al.

(10) Patent No.: US 12,741,198 B2
(45) Date of Patent: Sep. 22, 2026

(54) VIRTUAL SCENE INTERACTION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Jue Hu, Shenzhen (CN); Chunxiao Ge, Shenzhen (CN); Chen Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 996 days.

(21) Appl. No.: 17/878,867

(22) Filed: Aug. 1, 2022

(65) Prior Publication Data

US 2022/0370901 A1 Nov. 24, 2022

Related U.S. Application Data

(63) Continuation of application No. PCT/CN2021/091874, filed on May 6, 2021.

(30) Foreign Application Priority Data

May 28, 2020 (CN) ......................... 202010468602.5

(51) Int. Cl.
*A63F 13/335* (2014.01)
*A63F 13/35* (2014.01)
*A63F 13/537* (2014.01)

(52) U.S. Cl.
CPC ............ *A63F 13/335* (2014.09); *A63F 13/35* (2014.09); *A63F 13/537* (2014.09); *A63F 2300/407* (2013.01)

(58) Field of Classification Search
CPC ...... A63F 13/335; A63F 13/35; A63F 13/537; A63F 2300/407
See application file for complete search history.

(56) References Cited

U.S. PATENT DOCUMENTS 9,474,973 B2 * 10/2016 Perry .................... A63F 13/355
9,962,611 B2 * 5/2018 Perry .................... A63F 13/497
(Continued)

FOREIGN PATENT DOCUMENTS

CN 103886009 A 6/2014
CN 108066986 A 5/2018
(Continued)

OTHER PUBLICATIONS

The Japan Patent Office (JPO) Notification of Reasons for Refusal for Application No. 2022-556584 and Translation Jul. 25, 2023 9 Pages.

(Continued)

*Primary Examiner* — Ankit B Doshi
(74) *Attorney, Agent, or Firm* — Anova Law Group, PLLC

(57) ABSTRACT

A virtual scene interaction method is disclosed, including displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to an interaction progress point in the virtual scene, both i and N being positive integers, and i≤N; and displaying, when the $i^{th}$ interaction triggering mark is selected, a control page for the virtual scene starting from the interaction progress point linked by the $i^{th}$ interaction triggering mark.

20 Claims, 16 Drawing Sheets

(56) References Cited

U.S. PATENT DOCUMENTS

| | | | | |
|---|---|---|---|---|
| 10,913,003 | B2 * | 2/2021 | Miura | A63F 13/795 |
| 10,960,300 | B2 * | 3/2021 | Gary | A63F 13/30 |
| 11,040,281 | B2 * | 6/2021 | Perry | A63F 13/355 |
| 11,298,614 | B2 | 4/2022 | Posin | |
| 11,794,108 | B2 * | 10/2023 | Benedetto | A63F 13/49 |
| 2013/0127980 | A1 * | 5/2013 | Haddick | G06F 3/013 348/14.08 |
| 2013/0163956 | A1 | 6/2013 | Medhurst et al. | |
| 2014/0087871 | A1 * | 3/2014 | Kruglick | A63F 13/213 463/31 |
| 2014/0094302 | A1 * | 4/2014 | Wilkiewicz | A63F 13/92 463/31 |
| 2014/0187315 | A1 * | 7/2014 | Perry | A63F 13/88 463/29 |
| 2015/0105156 | A1 * | 4/2015 | Gault | A63F 13/30 463/31 |
| 2015/0290544 | A1 * | 10/2015 | Smith | A63F 13/92 463/31 |
| 2016/0188181 | A1 * | 6/2016 | Smith | G06F 3/04886 715/765 |
| 2016/0236084 | A1 | 8/2016 | Ikenaga | |
| 2017/0001119 | A1 * | 1/2017 | Perry | A63F 13/493 |
| 2017/0087464 | A1 * | 3/2017 | Perry | A63F 13/352 |
| 2017/0354888 | A1 * | 12/2017 | Benedetto | A63F 13/49 |
| 2018/0095636 | A1 * | 4/2018 | Valdivia | G06F 3/011 |
| 2018/0096507 | A1 * | 4/2018 | Valdivia | G06F 3/04842 |
| 2018/0178125 | A1 * | 6/2018 | Perry | A63F 13/67 |
| 2018/0221774 | A1 * | 8/2018 | Sullivan | A63F 13/352 |
| 2019/0270020 | A1 * | 9/2019 | Miura | A63F 13/795 |
| 2020/0001180 | A1 | 1/2020 | Turner et al. | |

FOREIGN PATENT DOCUMENTS

| | | | |
|---|---|---|---|
| CN | 109195025 | A | 1/2019 |
| CN | 109906107 | A | 6/2019 |
| CN | 110448894 | A | 11/2019 |
| CN | 110523079 | A | 12/2019 |
| CN | 111054067 | A | 4/2020 |
| CN | 111603764 | A | 9/2020 |
| CN | 111736739 | A | 10/2020 |
| EP | 2745893 | A2 | 6/2014 |
| JP | 2014121610 | A | 7/2014 |
| JP | 2017520363 | A | 7/2017 |
| JP | 2019527079 | A | 9/2019 |
| WO | 2014055108 | A1 | 4/2014 |

OTHER PUBLICATIONS

European Patent Office European Search Report for Application No. 21811852.9-1208 Dec. 7, 2022 9 pages.

Hsiao Catherine: "The Magic of State Share, Explained", Mar. 6, 2020 4 pages.

China National Intellectual Property Administration (CNIPA) Office Action 1 for 202010468602.5 Feb. 22, 2021 12 Pages (including translation).

The World Intellectual Property Organization (WIPO) International Search Report for PCT/CN2021/091874 Aug. 2, 2021 7 Pages (including translation).

The Japan Patent Office (JPO) Notification of Reasons for Refusal for Application No. 2022-556584 and Translation Nov. 21, 2023 11 Pages.

* cited by examiner

VIRTUAL SCENE INTERACTION METHOD AND APPARATUS, DEVICE, AND STORAGE MEDIUM

RELATED APPLICATIONS

This application is a continuation application of PCT Application No. PCT/CN2021/091874, filed on May 6, 2021, which in turn claims priority to Chinese Patent Application No. 2020104686025, entitled "CLOUD GAMING PROCESSING METHOD AND DEVICE" filed with the National Intellectual Property Administration, PRC on May 28, 2020. The two applications are both incorporated herein by reference in their entirety.

FIELD OF THE TECHNOLOGY

This application relates to the field of computer technologies, and specifically, to the field of the cloud technology, and in particular, to a virtual scene interaction method and apparatus, a device, and a storage medium.

BACKGROUND OF THE DISCLOSURE

The cloud computing technology has been widely applied in many scenarios, and many online application technologies have been realized based on the cloud computing technology. Virtual scene interaction is one of the online application scenarios. Generally, a cloud service page is provided, and a user triggers and enters a control page for a virtual scene through a unique and fixed entry in the cloud service page.

For ease of understanding, a description is provided by using cloud gaming as an example. The cloud gaming may also be referred to as gaming on demand, which is an online gaming technology based on the cloud computing technology. FIG. 1 is a schematic diagram of a cloud service page in a conventional method. As shown in FIG. 1, a plurality of cloud games are summarized in a cloud service page 10, and content displayed by each cloud game in the cloud service page 10 is consistent, including an image 101, a name 102 and an entry 103. The image 101 may be a thumbnail of a frame of game picture of the cloud game. A player can obtain a brief introduction of the cloud game based on the image 101 and the name 102, and can start and enter the cloud game through the entry 103 for cloud trial play. Obviously, the player can only enter the cloud game through the unique and fixed entry of the cloud game for cloud trial play, and there is a problem of an undiversified cloud trial play manner.

Often, the control page for the virtual scene can be triggered and entered only through the unique and fixed entry, which is very limiting.

SUMMARY

According to various embodiments provided in this application, a virtual scene interaction method and apparatus, a device, and a computer-readable storage medium are provided.

One aspect of this application provides a virtual scene interaction method, performed by a computer device, the method including displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to an interaction progress point in the virtual scene, both i and N being positive integers, and i≤N; and displaying, when the $i^{th}$ interaction triggering mark is selected, a control page for the virtual scene starting from the interaction progress point linked by the $i^{th}$ interaction triggering mark.

Another aspect of this application provides another virtual scene interaction method, performed by a computer device, the method including returning, in response to a service request of a terminal device, a viewing page of a target cloud video to the terminal device, a play screen of a virtual scene being displayed in the target cloud video, the viewing page comprising N interaction triggering marks, an $i^{th}$ interaction triggering mark of the N interaction triggering marks being used for linking to an interaction progress point in the virtual scene, both i and N being positive integers, and i≤N; and returning, when the terminal device selects the $i^{th}$ interaction triggering mark and transmits an interaction request, a control page for the virtual scene to the terminal device starting from the interaction progress point linked by the $i^{th}$ interaction triggering mark.

Another aspect of this application provides a virtual scene interaction apparatus, disposed in a computer device, the apparatus including: one or more processors, configured to execute computer-readable instructions; and a computer-readable storage medium, storing computer-readable instructions, the computer-readable instructions, when executed by the one or more processors, implementing a plurality of operations. The operations include displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to an interaction progress point in the virtual scene, both i and N being positive integers, and i≤N; and displaying, when the $i^{th}$ interaction triggering mark is selected, a control page for the virtual scene starting from the interaction progress point linked by the $i^{th}$ interaction triggering mark.

Another aspect of this application provides one or more non-transitory computer-readable storage media, storing computer-readable instructions, the computer-readable instructions, when executed by one or more processors, implementing the foregoing virtual scene interaction method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
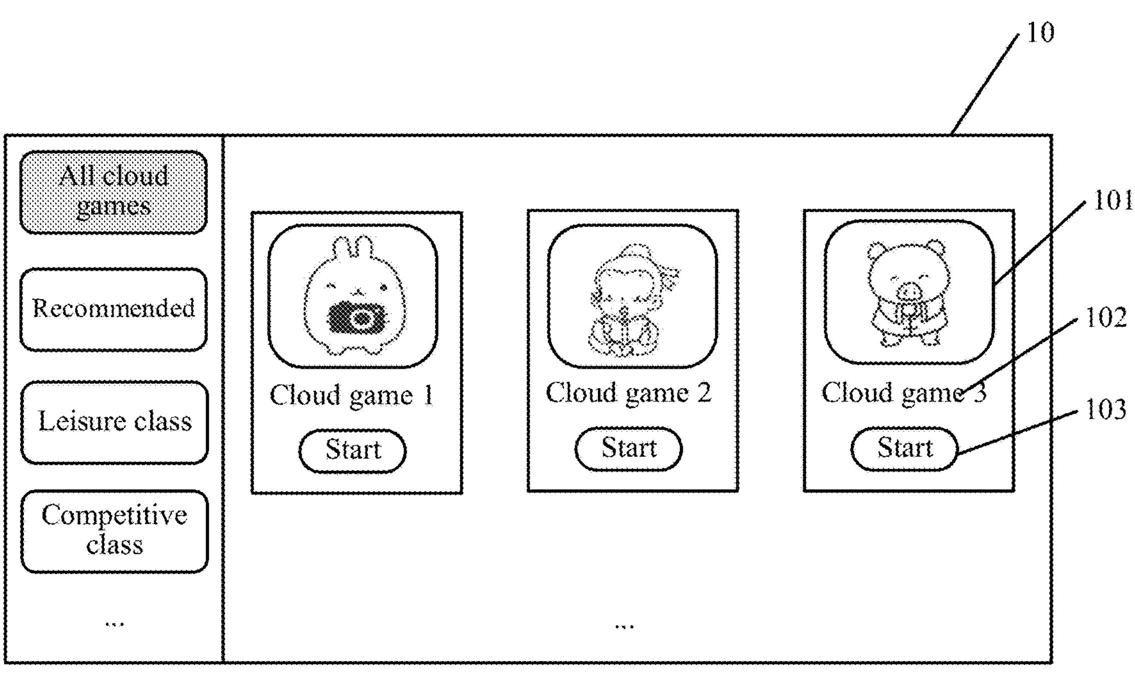
FIG. 1 is a schematic diagram of a cloud service page in a conventional method.

The following describes technical solutions in embodiments of this application with reference to the accompanying drawings.

The embodiments of this application relate to the cloud technology, cloud computing, and cloud gaming. cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode. Cloud technology may form a resource pool, which is used on demand, and is flexible and convenient. A backend service of a technical network system requires a large amount of computing and storage resources, such as video websites, image websites, and more portal websites. As the Internet industry is highly developed and applied, each article may have its own identifier in the future and needs to be transmitted to a backend system for logical processing. Data at different levels is separately processed, and data in various industries requires strong system support, which can only be achieved through cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid for according to usage. A provider of cloud computing service builds a cloud computing resource pool platform (which is referred to as a cloud platform for short, and is generally referred to as an Infrastructure as a Service (IaaS)), and deploys a plurality of types of virtual resources in the resource pool for customers to choose from. The cloud computing resource pool mainly includes: a computing device (which is a virtualized machine, including an operating systems), a storage device, and a network device.

Cloud gaming, which may also be referred to as gaming on demand, is an online gaming technology based on the cloud computing technology. The cloud gaming technology enables thin clients with relatively limited graphics processing and data computing capabilities to run high-quality games. In a cloud game scene, the game is not run on a game terminal of a player, but in a cloud server, and the cloud server renders a game scene into video/audio streams, and transmits the video/audio streams to the game terminal of the player through a network. The game terminal of the player does not need to have strong graphics computing and data processing capabilities, but only needs to have the basic streaming media playback capability and the capability to obtain player input instructions and send the player input instructions to the cloud server. When a player tries a cloud game, he is essentially operating stream (audio streams and video streams) data of the game picture.

The embodiments of this application also involve the following concepts:

(1) Cloud video. A cloud video refers to a video saved in a cloud server, which is sent by the cloud server by streaming to the terminal device for playback. In one embodiment, cloud videos may include cloud game videos, that is, videos related to the cloud game recorded and saved by the cloud server that provides the cloud game, which include, but not limited to: a background video of the cloud game, a complete cloud trial play video obtained by performing a cloud trial play operation on the complete cloud game, a cloud trial play video corresponding to a game progress obtained by performing a cloud trial play operation on the game progress of the cloud game, a video obtained by performing processing such as clipping on highlights in the cloud trial play video, and the like. The cloud trial play video refers to a file in an audio and video form used for describing a cloud trial play process, and is obtained in the following manner: the cloud server automatically records and saves cloud trial play operations of the player during cloud trial play of the cloud game and related game data, and generates the cloud trial play video according to the saved data.

(2) Bullet comment. The bullet comment is a special function provided by some video sharing websites. With this function, video viewers can post their comments through bullet comments while watching a video, and the comments are instantly displayed as sliding subtitles at the time point that all viewers of the video watch this video, to ensure that the comments can be noticed by all the viewers, thereby realizing interaction between the viewers, and even expressing praise or criticism of the video work jointly to increase the viewing pleasure. The bullet comment may be considered as an instant commenting mechanism for videos. The instant commenting mechanism usually causes comments to be displayed in an effect of floating across a screen, which looks like flying bullets, so that people call comments with this display effect bullet comments.

(3) Video clipping. Video clipping is a method of editing video source files, and is a process of adding pictures, background music, special effects, scenes and other materials to a video and remixing them with the video, cutting and combining the video source files, and generating a new video with different expressiveness through secondary encoding, to express the content of ideas that the creator intends to express. There are usually two editing manners: One is linear editing (which is also referred to as destructive editing), which is a process of editing in the sequence of video recording. Characteristics of the manner is: (1) the video image quality has serious losses after a plurality of times of editing; (2) editing can only be performed in chronological order; (3) to change the order of pictures, it is necessary to use the manner of copying and pasting, which has low efficiency. The other is non-linear editing (which is also referred to as non-destructive editing), which is a process of editing without the need to follow the sequence of video recording. Characteristics of the manner is: (1) the video image quality almost has no loss regardless of the quality of times of editing; (2) Editing is performed at will with no limitation of the chronological order; (3) the sequence of the pictures can be changed without limitation.

(4) Game progress. It is a play progress point of game content. When a game is entered, the game progress is 0%, and when the play is cleared, it means that the game progress has reached 100%. The game progress is usually multi-threaded and multi-branched. For example, levels of a character are a thread. When the character reaches the full level (that is, reaches the highest level of the character), the game progress related to the character level is 100%; In another example, equipment (such as weapons and energy) is various. When no apparatus of the character has been collected, a game progress of equipment collection related to the character is 0%; and when all equipment of the character is collected, the game progress of equipment collection related to the character is 100%. Therefore, the game progress is actually an intuitive perception result produced by comprehensive factors such as a play time and an operation progress.

(5) Archive. It refers to a process of saving or storing a cloud game video or saving a cloud game video to a disk, and the content that is saved, stored or saved to the disk is referred to as an "archive". The archive is digitized storage information used for recording a game progress of a player in a cloud game, and is a digital file that integrates game progresses of the player in various dimensions in the cloud game.

The embodiments of this application provide a virtual scene interaction solution. The solution may be applied to any application scenarios involving virtual scene interaction, such as a cloud game scene, a cloud travel scene, and a cloud house viewing scene.

In an embodiment, the virtual scene interaction method may include the following steps: displaying a viewing page of a target cloud video, a play screen of a virtual scene being displayed in the target cloud video, the viewing page including N interaction triggering marks, an $i^{th}$ interaction triggering mark in the N interaction triggering marks being used for linking to an interaction progress in the virtual scene, both i and N being positive integers, and i≤N; and displaying, when the $i^{th}$ interaction triggering mark is selected, a control page for the virtual scene starting from the interaction progress linked by the $i^{th}$ interaction triggering mark.

The viewing page is a page for watching the target cloud video. That is, the target cloud video is played in the viewing page. A cloud video refers to an online non-local video. The interaction triggering mark is a mark used for triggering and entering the control page for interaction. The control page for the virtual scene is a virtual scene page displayed starting from a picture corresponding to the interaction progress linked by the $i^{th}$ interaction triggering mark in the virtual scene after a user watches the virtual scene, and is configured for the user to control a virtual object for interaction. For example, if the user intends to try the game after watching the game video, the user may trigger the interaction triggering mark (such as a play start mark of the game), and then a game page of the game may be displayed starting from a game progress corresponding to the interaction triggering mark. Subsequently, the user may control a game character to perform interaction based on the game page.

It may be understood that, in the game scene, the target cloud video may be a target cloud game video, the viewing page may be a viewing page of the target cloud game video, and the interaction triggering mark may be a play start mark of the target cloud game. The play start mark refers to a mark for starting the target cloud game to operate the target cloud game. The interaction progress in the virtual scene may be a game progress in the target cloud game. The control page for the virtual scene may be a game page of the target cloud game. The displaying, when the $i^{th}$ interaction triggering mark is selected, a control page for the virtual scene starting from the interaction progress linked by the $i^{th}$ interaction triggering mark may include: when an $i^{th}$ play start mark is selected, starting the target cloud game, and displaying the game page of the target cloud game starting from a game progress linked by the $i^{th}$ play start mark.

In an embodiment, the target cloud video includes N archives, an $i^{th}$ archive in the N archives being associated with the $i^{th}$ interaction triggering mark.

In an embodiment, the viewing page includes a play window, the play window being used for playing the target cloud video; and the play window includes a play progress indicator axis, the $i^{th}$ interaction triggering mark being set in the play progress indicator axis.

In an embodiment, the viewing page includes a play window, the play window being used for playing the target cloud video, the play window including a play progress indicator axis, the $i^{th}$ archive being corresponding to a play position in the play progress indicator axis; and the method further includes: displaying a prompt box of the $i^{th}$ archive in the play window when a progress pointer in the play progress indicator axis points to the play position corresponding to the $i^{th}$ archive, the $i^{th}$ interaction triggering mark being set in the prompt box of the $i^{th}$ archive.

In an embodiment, the method further includes: closing the prompt box of the $i^{th}$ archive in the play window when the progress pointer in the play progress indicator axis is away from the play position corresponding to the $i^{th}$ archive and a display duration of the prompt box of the $i^{th}$ archive reaches a set duration.

In an embodiment, the viewing page includes an archive display region, a key image of the $i^{th}$ archive being displayed in the archive display region, the $i^{th}$ interaction triggering mark being set in the key image of the $i^{th}$ archive.

In an embodiment, the viewing page includes a play window, the play window being used for playing the target cloud video, a cloud comment being displayed in the play window during playback of the target cloud video, the cloud comment being a comment released after control is performed based on the control page and for a control cloud video generated based on the control; and the control cloud video is played when the cloud comment is selected, the $i^{th}$ interaction triggering mark being set in a playback page of the control cloud video.

It may be understood that the control cloud video is a cloud video generated by controlling the control page, and is used for displaying a virtual scene picture generated by the control.

In an embodiment, in the game scene, the control cloud video may be a cloud trial play video, that is, a video generated through trial play of the target cloud game, which is used for displaying a game picture of the trial play of the target cloud game. The cloud comment may be a comment released for the cloud trial play video after entering of the target cloud game from the game progress of the target cloud game and trying the target cloud game.

In an embodiment, the viewing page includes a play window and an archive display region, the play window being used for playing the target cloud video, the play window including a play progress indicator axis, the $i^{th}$ archive being corresponding to a play position in the play progress indicator axis, and a key image of the $i^{th}$ archive being displayed in the archive display region; and when a progress pointer in the play progress indicator axis points to the play position corresponding to the $i^{th}$ archive, the key image of the $i^{th}$ archive in the archive display region is highlighted.

In an embodiment, that the key image of the $i^{th}$ archive in the archive display region is highlighted includes at least one of the following processing: the key image of the $i^{th}$ archive in the archive display region being displayed in a first color, and regions other than the key image of the $i^{th}$ archive being displayed in a second color; and the key image of the $i^{th}$ archive in the archive display region being displayed at a first brightness, and regions other than the key image of the $i^{th}$ archive being displayed at a second brightness.

In an embodiment, the method further includes: displaying an interaction prompt when the control page is displayed starting from the interaction progress linked by the $i^{th}$ interaction triggering mark, the interaction prompt including a remaining duration and an exit option; and starting countdown from the remaining duration, and stopping displaying the control page when the remaining duration is counted as 0; or stopping displaying the control page when the exit option is selected.

It may be understood that in the game scene, the control page may be the game page of the target cloud game. Controlling the target cloud game is trial play of the target cloud game, and the interaction prompt may be a cloud trial play prompt. Stopping displaying the control page may be stopping displaying the game page of the target cloud game and exiting the target cloud game.

In an embodiment, the method further includes: displaying a cloud clipping page, and playing a control cloud video in the cloud clipping page, the cloud clipping page including a selection box and an information input box; and obtaining a selected video clip from the control cloud video by using the selection box, and obtaining comment information by using the information input box, the control cloud video being a video generated according to a received control operation performed on the control page after displaying the control page starting from the interaction progress linked by the $i^{th}$ interaction triggering mark to stopping displaying the control page.

It may be understood that in the game scene, the control operation may be a cloud trial play operation. The video generated according to the received control operation performed on the control page may be a video generated according to a received cloud trial play operation performed on the target cloud game.

In an embodiment, the cloud clipping page further includes a release control; the viewing page includes a play window, the play window being used for playing the target cloud video; and the method further includes: displaying a cloud comment in the play window when the release control is clicked, the cloud comment being generated according to the selected video clip and the comment information; and playing the selected video clip of the control cloud video when the cloud comment is selected, information of the cloud comment being further displayed in a playback page of the selected video clip.

In an embodiment, the information of the cloud comment includes at least one of the following: an identifier of a publisher, an identifier of the control cloud video, an identifier of the selected video clip, an identifier of an $i^{th}$ archive corresponding to the control cloud video, a release time, and an attention level.

In the embodiments of this application, the play screen of the virtual scene is played based on the target cloud video, so that content of the virtual scene is relatively comprehensively displayed, and the player can understand the information of the virtual scene more comprehensively. In addition, the viewing page of the target cloud video includes a plurality of interaction triggering marks. Through the multi-dimensional interaction triggering marks, multi-dimensional interaction progresses in the virtual scene can be directly entered from the watched video for control operations, and it is unnecessary to find a fixed entry through complex operations, thereby avoiding limitations, greatly improving efficiency, reducing operating costs, and avoiding waste of system resources caused by complex operations.

In an embodiment, the cloud game scene is used as an example to describe the solution, and specifically, the cloud game is described in relation to a cloud game video, so that the cloud game can be relatively comprehensively displayed in terms of operation skills, game content, and the like, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations.

The following describes a virtual scene interaction solution provided in the embodiments of this application in detail with reference to the accompanying drawings.

Figure 2:
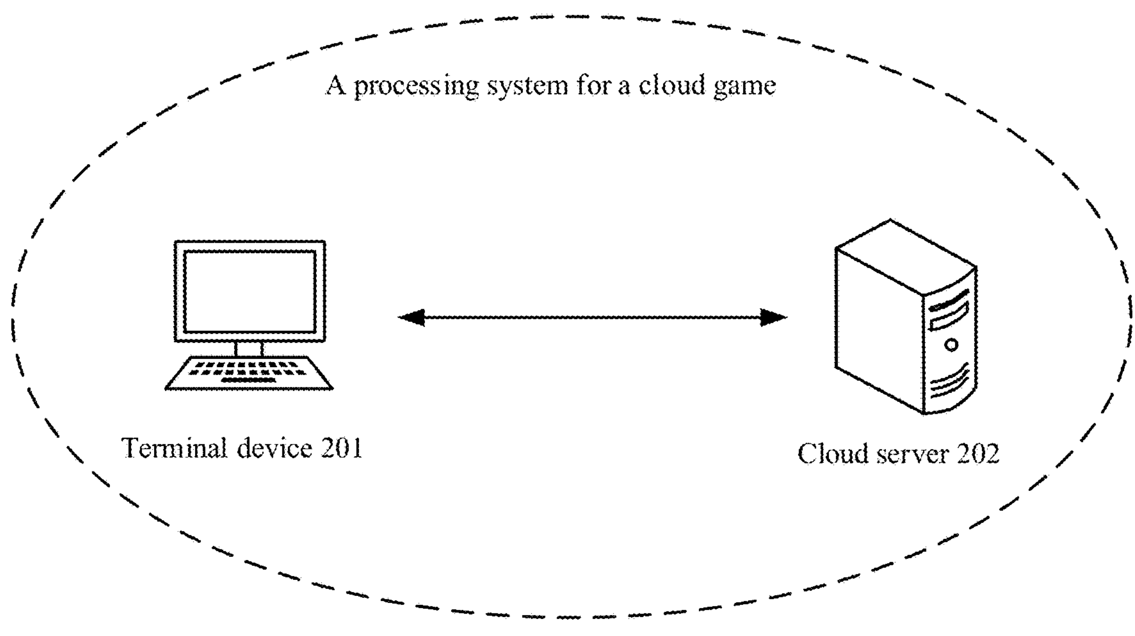
FIG. 2 is an architectural diagram of a virtual scene interaction system according to an exemplary embodiment of this application.

FIG. 2 is an architectural diagram of a virtual scene interaction system according to an exemplary embodiment of this application. As shown in FIG. 2, the virtual scene interaction system may include a terminal device 201 and cloud server 202. The quantities of terminal devices and cloud servers in the virtual scene interaction system shown in FIG. 2 are merely an example. For example, there may be a plurality of terminal devices and a plurality of cloud servers. The quantities of terminal devices and cloud servers are not limited in this application. The terminal device 201 may be a device used by a player of a cloud game. Herein, the player may be a user who has experienced the cloud game or requests to experience the cloud game. The terminal device 201 may include, but not limited to, a smart phone (such as an Android mobile phone or an iOS mobile phone), a tablet computer, a portable personal computer, a mobile Internet device (MID), and other devices. The type of the terminal device 201 is not limited in this embodiment of this application. The cloud server 202 may be an independent physical server, or may be a server cluster including a plurality of physical servers or a distributed system. The cloud server 202 may provide basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal device 201 may be communicatively connected to the cloud server 202 directly or indirectly in a wired or wireless manner, and the connection manner between the terminal device 201 and the cloud server 202 is not limited in this embodiment of this application.

In the virtual scene interaction system shown in FIG. 2, a virtual scene interaction process includes the following parts: (1) A virtual scene interaction process executed on the side of the terminal device 201. On one hand, the terminal device 201 obtains various pages related to cloud game by interacting with the cloud server 202, the pages herein including, for example, a cloud service page, a page of a cloud game video, a game page of the cloud game, a cloud clipping page, and the like; and displays these pages to the player. On the other hand, the terminal device 201 receives various operations of the player in these page, the operations including, for example, an operation for requesting to experience the cloud game, a cloud trial play operation for the cloud game, a cloud clipping operation, and the like; and sends these operations to the cloud server 202. (2) A virtual scene interaction process executed on the side of the cloud server 202. By interacting with the terminal device 201, the cloud server 202 provides corresponding cloud services for the terminal device 201 in response to various requests of the terminal device 201. The requests herein include, for example, a page obtaining request, an operation request, and the like. The provided cloud services include, for example, providing various pages related to the cloud game required by the terminal device 201, a cloud clip service, a management service for cloud trial play videos, a cloud comment service, and the like.

Figure 3:
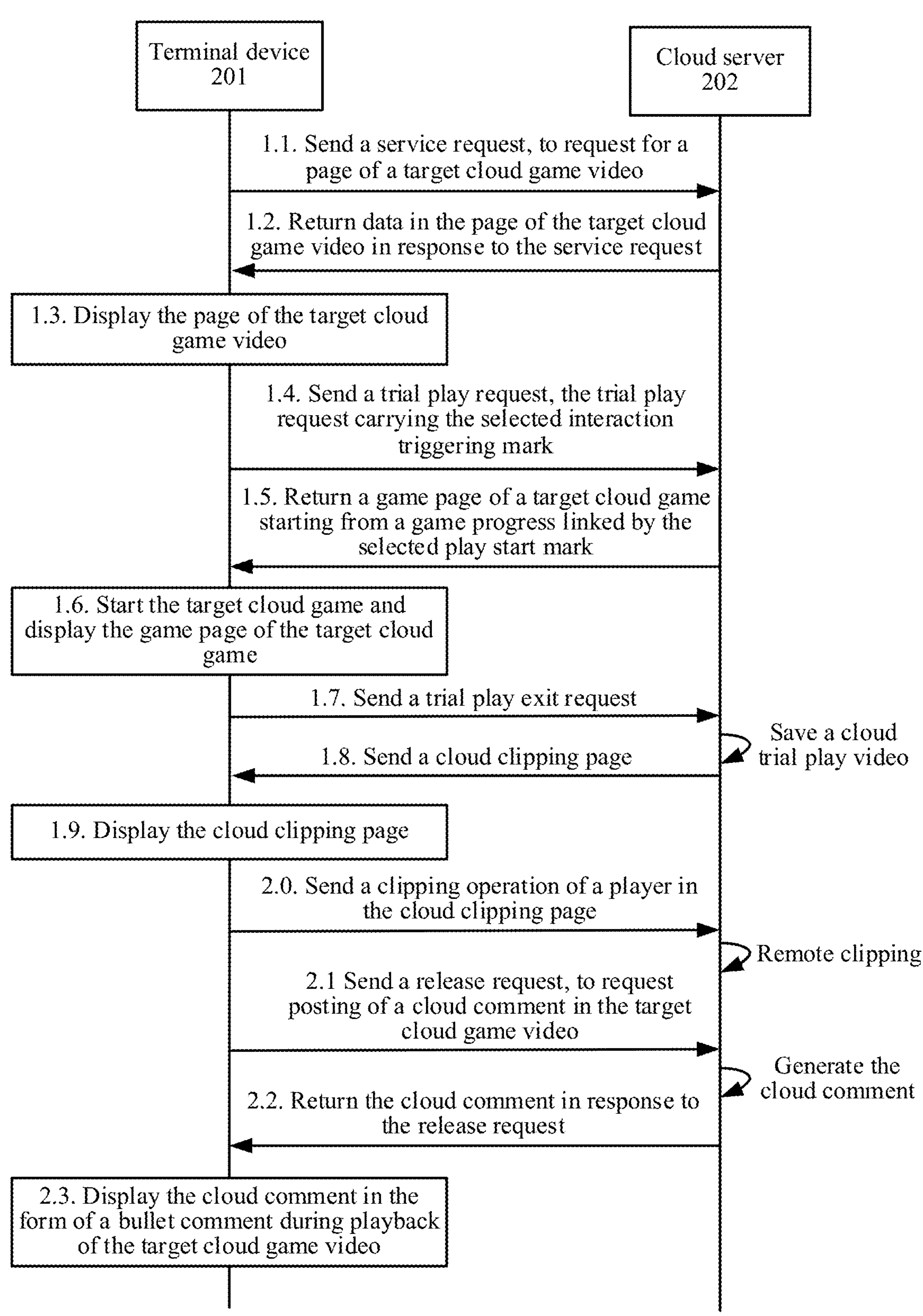
FIG. 3 is a flowchart of a virtual scene interaction method according to an exemplary embodiment of this application.

FIG. 3 is a flowchart of a virtual scene interaction method according to an exemplary embodiment of this application. The method is implemented through interaction between the terminal device 201 and the cloud server 202 shown in FIG. 2. The method may include the following steps 1.1 to 1.7:

1.1. The terminal device 201 sends a service request to the cloud server 202 to request a page of a target cloud game video.

1.2. The cloud server 202 returns data in the page of the target cloud game video to the terminal device in response to the service request of the terminal device 201. The data in the page of the target cloud game video may include: (1) stream data (audio stream and video stream) of the target cloud game video; (2) a plurality of interaction triggering marks of a target cloud game, each of the interaction triggering marks being used for linking to a game progress in the target cloud game; (3) a plurality of archives of the target cloud game video, one archive being associated with one interaction triggering mark. In a specific embodiment, the cloud server 202 compresses the data in the page of the target cloud game video, and then transmits the data to the terminal device 201 through a network.

1.3. The terminal device 201 displays the page of the target cloud game video. In the page of the target cloud game video, a player can watch the target cloud game video to learn about operation skills, game content, and other information of the target cloud game. In addition, when the player decides to have a trial play experience of the target cloud game, the player may start the target cloud game by using any interaction triggering mark in the page of the target cloud game video, and performs trial play starting from a corresponding game progress of the target cloud game.

1.4. When the player selects any interaction triggering mark in the page of the target cloud game video, the terminal device 201 sends a trial play request to the cloud server 202, the trial play request carrying the selected interaction triggering mark.

1.5. The cloud server 202 starts and initializes the target cloud game, advances the target cloud game to the game progress linked by the selected interaction triggering mark, and returns a game page (including a game picture and sound effects) of the target cloud game to the terminal device 201 starting from the game progress.

1.6. The terminal device 201 starts the target cloud game and displays the game page returned by the cloud server 202, so that the player can perform a trial play operation in the game page; and the cloud server 202 records a trial play process of the player.

1.7. When the player closes the game page of trial play and exits the target cloud game, the terminal device 201 sends a trial play exit request to the cloud server 202, and the cloud server 202 stops recording and generates a cloud trial play video of the player, and saves the cloud trial play video of the player.

Based on the records of the foregoing steps, it can be seen that in the virtual scene interaction method of this embodiment of this application, the cloud game is described in relation to a cloud game video, so that the cloud game can be relatively comprehensively displayed in terms of operation skills, game content, and the like, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations.

In addition, in the cloud game scene, there is usually a requirement for video clipping. For example, the player intends to clip highlights in the cloud trial play video to facilitate saving and sharing. Conventional video clipping is generally implemented by installing a clipping tool on the terminal device and with the help of the clipping tool, and a clipped video object is a local video that has been stored in the terminal device. The cloud trial play video is a video recorded and stored by the cloud server, rather than a local video of the terminal device, so that if the cloud trial play video is to be processed in the traditional clipping method, one solution is that the terminal device needs to first download the cloud trial play video from a cloud, and then use the local clipping tool to perform clipping. This method needs to occupy storage space of the terminal device, and has a relatively high requirement on a memory of the terminal device. Another solution is that the terminal device needs to first record a cloud trial play process locally, and after a local video of the terminal device is formed, use the clipping tool to complete the video clipping. For example, additional video recording software needs to be installed on the terminal device, and during trial play of the player for the target cloud game, the video recording software is run to record the cloud trial play process to form a local video of the terminal device, and then the local video is clipped by using the clipping tool. When the video recording software is run, it additionally occupies memory resources of the terminal device, which affects the trial play process of the target cloud game. In addition, affected by factors such as video definition, sound quality, and the like, the recorded video may occupy a large amount of hard disk space. For example, hard disk space occupied by a video with a duration of 1 minute and resolution of 1080p (progressive scanning) recorded on a mobile phone is about 100 megabytes (MB); and hard disk space occupied by a video with a duration of 1 hour and resolution of 1080p is about 5.8 gigabytes (GB). The performance and memory sizes of many common terminal devices (for example, mobile phones) cannot meet the foregoing clipping requirement, and consequently, clipping of cloud trial play videos cannot be realized. Based on this, the virtual scene interaction solution provided in the embodiments of this application is also dedicated to solving the problem of cloud clipping, which is specifically: performing cloud clipping on a cloud trial play video to meet clipping requirements of the cloud game scene. With reference to FIG. 3, the virtual scene interaction method according to this embodiment of this application may further include the following steps 1.8 to 2.0:

1.8. After the player finishes the trial play process of the target cloud game, the cloud server 202 sends a cloud clipping page to the terminal device 201, data in the cloud clipping page including cloud trial play video of the player.

1.9. The terminal device 201 displays the cloud clipping page, where the player may perform a cloud clipping operation on the cloud trial play video of the player in the cloud clipping page, for example, select some wonderful video clips by using a selection box in the cloud clipping page, and may further configure comment information such as a title for the selected video clips.

2.0. The terminal device 201 sends the cloud clipping operation of the player in the cloud clipping page to the cloud server 202, and the cloud server 202 clips the cloud trial play video of the player in response to cloud clipping operation of the player, so as to realize remote cloud clipping.

Based on the records of the foregoing steps 1.8 to 2.0, it can be seen that the virtual scene interaction method in this embodiment of this application supports cloud clipping; the clipping process occurs in the cloud; and the terminal device does not need to download or record the cloud trial play video for local clipping, which reduces requirements on the performance and storage space of the terminal device.

Figure 4:
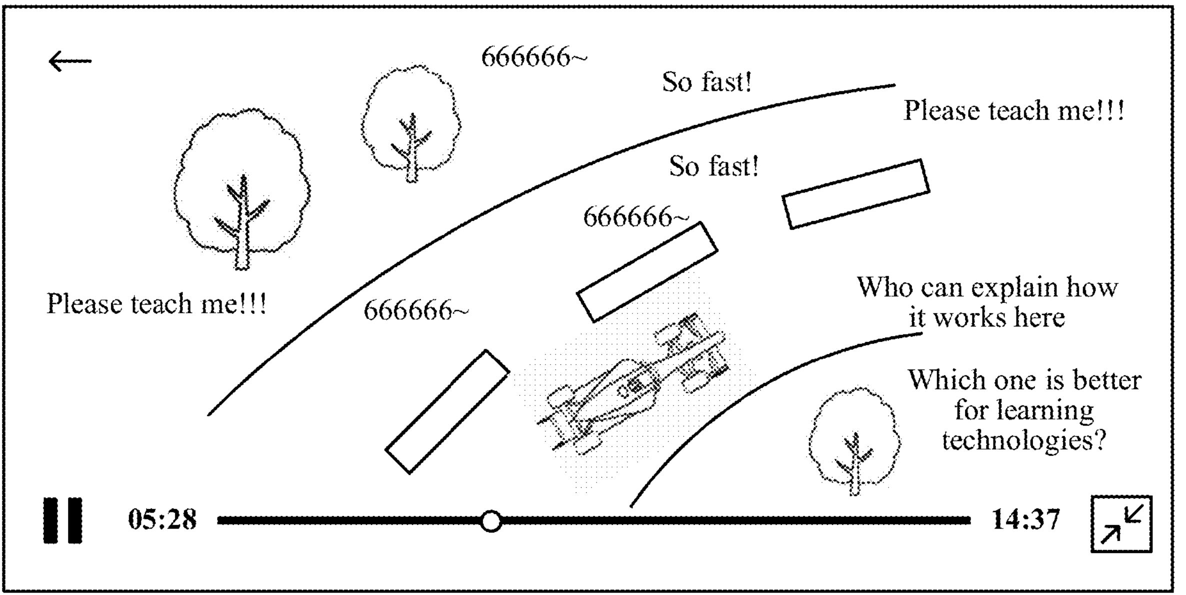
FIG. 4 is a schematic diagram of video bullet comments in a conventional method.

In addition, in the cloud game scene, there is usually a need for sharing. For example, the player intends to share with other players the wonderful video clips during trial play of the player for the target cloud game obtained through cloud clipping. Bullet comments are an important sharing function in videos. However, bullet comments in videos at present is limited to text bullet comments. For example, FIG. 4 is a schematic diagram of video bullet comments in a conventional method. As shown in FIG. 4, when the cloud game video is played to a certain difficulty level, a player has cleared the difficulty level, then the player hopes to tell other players the operation skills herein through a bullet comment. If a description is provided only in the form of text, limited by the expressiveness of the text bullet comment, it is usually difficult to accurately describe the timing of each operation, and the purpose of effective sharing cannot be achieved. It can be seen that the text bullet comment may not be well adapted to expression requirements in the cloud game scene. Based on this, the virtual scene interaction method in this embodiment of this application is also dedicated to solving the problem of the expressiveness of bullet comments, which is specifically: expanding expression forms of comments (or bullet comments), and designing a visualized cloud comment in the cloud game scene. Visualization refers to comments presented in the form of a video, and a video or video clip expressing content such as operation skills and operation procedures can be browsed by clicking the cloud comment. Based on such cloud comments, the expressiveness of comments can be improved, thereby being more adapted to the expression requirements of the cloud game scene. The cloud comment can be displayed as a bullet comment effect in the cloud game video. When a bullet comment presented by the cloud comment is triggered (for example, clicked), the video or video clip corresponding to the cloud comment is displayed in a jump. With reference to FIG. 3, the virtual scene interaction method according to this embodiment of this application may further include the following steps 2.1 to 2.4:

2.1. The cloud clipping page may include a release control (such as a publishing option or a publishing button). When the release control is clicked, the terminal device 201 sends a release request to the cloud server 202, to request to post a cloud comment in the target cloud game video.

2.2. In response to the release request of the terminal device 201, the cloud server 202 generates a cloud comment according to the selected video clip and the inputted comment information (such as a title) in the cloud clipping process, and returns the cloud comment to the terminal device.

2.3. The terminal device 201 displays the cloud comment in the form of a bullet comment during playback of the target cloud game video.

2.4. When any player clicks on the cloud comment, the terminal device 201 jumps to play the selected video clip of the cloud trial play video corresponding to the cloud comment; in addition, information of a publisher (that is, the player) of the cloud comment including an avatar and a nickname may further be displayed in a playback page of the selected video clip; and an archive (that is, an archive associated with the selected interaction triggering mark) from which the publishers performs trial play is displayed.

Based on the records of the foregoing steps 2.1 to 2.4, it can be seen that the virtual scene interaction method in this embodiment of this application supports visualized cloud comments presented in the form of videos, which improves the expressiveness of comments, thereby being more adapted to the expression requirements of the cloud game scene, and enhancing interactivity between players.

Figure 5:
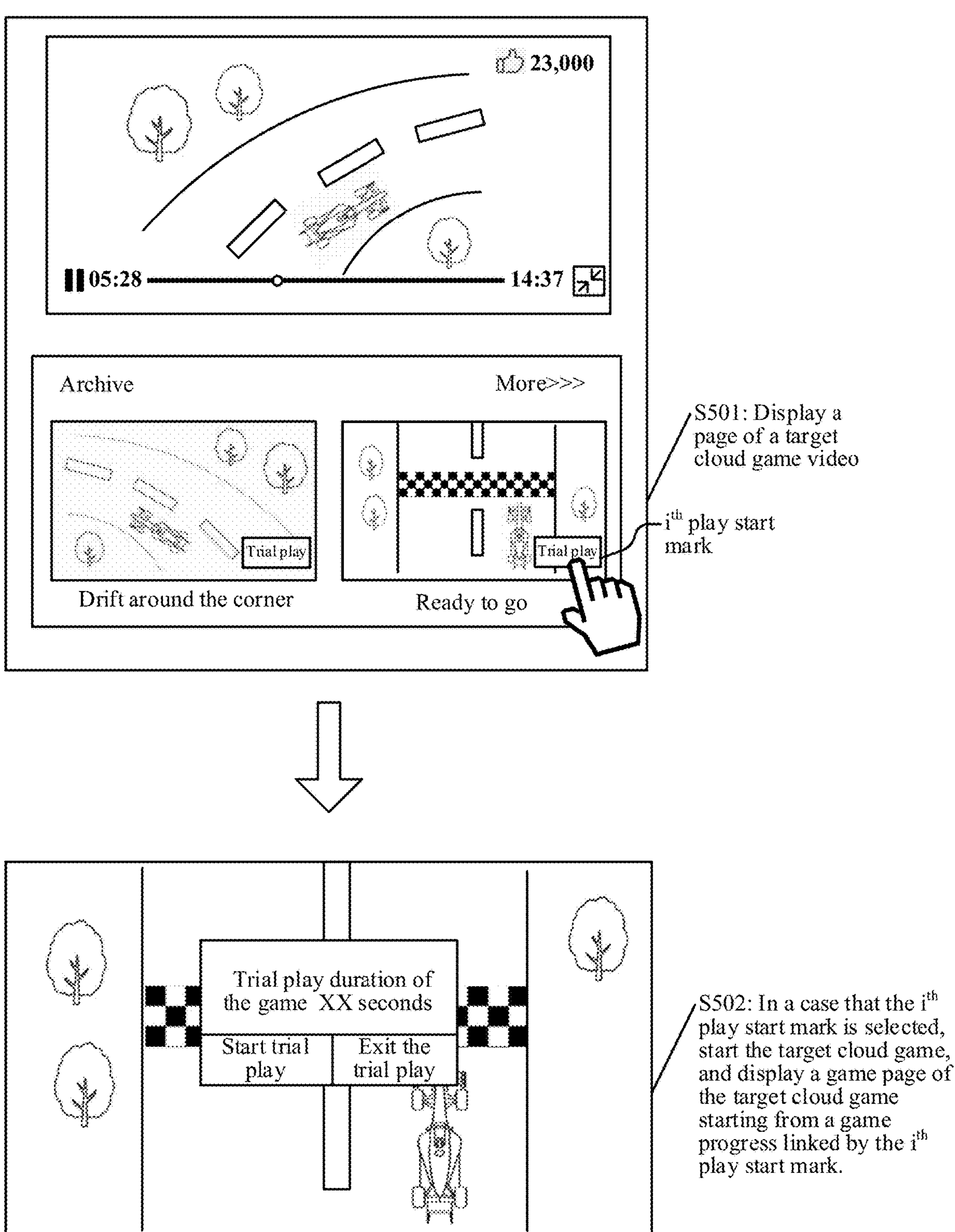
FIG. 5 is a flowchart of a virtual scene interaction method according to an exemplary embodiment of this application.

FIG. 5 is a flowchart of a virtual scene interaction method according to an exemplary embodiment of this application. The virtual scene interaction method may be performed by the terminal device 201 shown in FIG. 2. As shown in FIG. 5, the virtual scene interaction method includes the following steps S501 to S502:

S501: Display a page of a target cloud game video, the page of the target cloud game video including N interaction triggering marks of a target cloud game, an $i^{th}$ interaction triggering mark in the N interaction triggering marks being used for linking to a game progress in the target cloud game, both i and N being positive integers, and i≤N.

S502: When the $i^{th}$ interaction triggering mark is selected, start the target cloud game, and display a game page of the target cloud game starting from a game progress linked by the $i^{th}$ interaction triggering mark.

In steps S501 to S502, a player may watch the target cloud game video from the page of the target cloud game video, so as to learn about information such as operation skills and game content of the target cloud game. A plurality of interaction triggering marks are displayed in the page of the target cloud game video, and the interaction triggering mark may be considered as an entry of the target cloud game. When the player decides to have a trial play experience of the target cloud game, the player may start the target cloud game by using any interaction triggering mark (for example, the $i^{th}$ interaction triggering mark) in the page of the target cloud game video.

The terminal device displays the game page starting from the game progress of the target cloud game that is linked by the clicked $i^{th}$ interaction triggering mark, and the player may perform a trial play operation in the game page.

Figure 6:
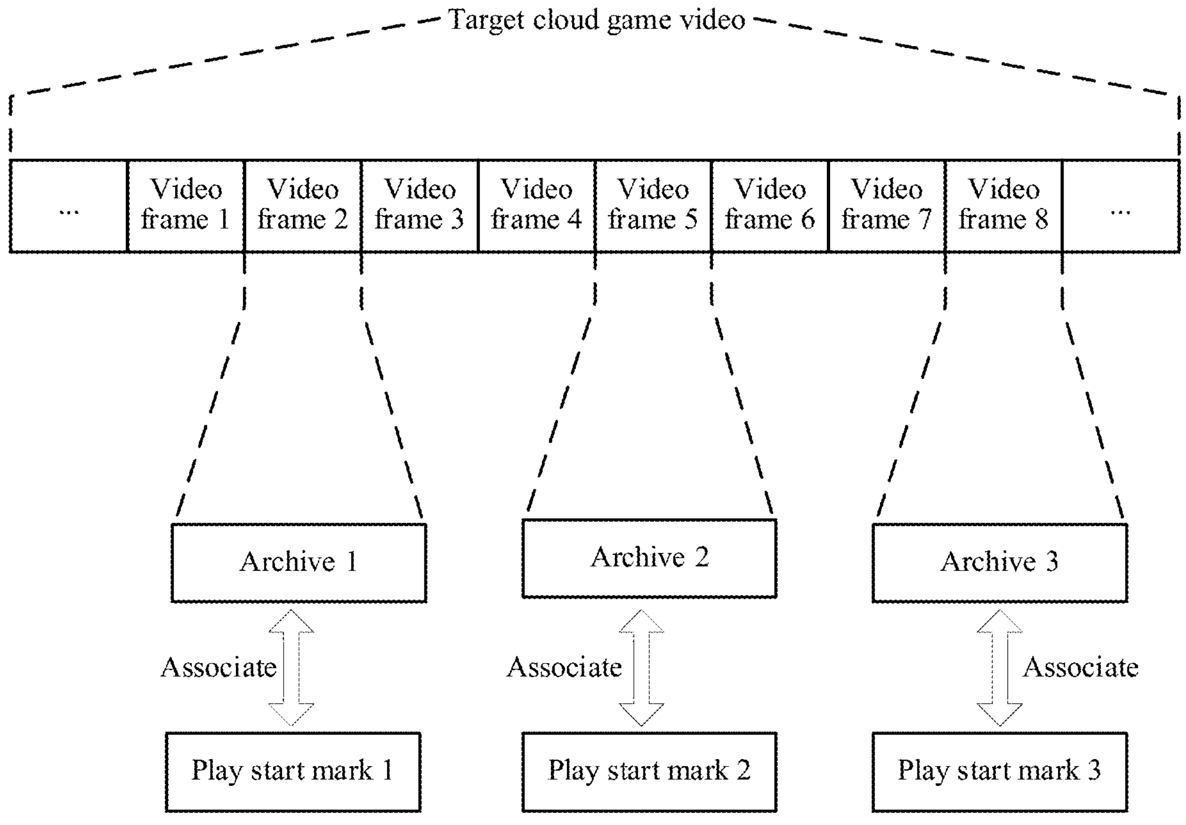
FIG. 6 is a schematic diagram of a relationship between a target cloud game video, archives, and interaction triggering marks according to an exemplary embodiment of this application.

In an embodiment, the target cloud game video includes N archives. FIG. 6 is a schematic diagram of a relationship between a target cloud game video, archives, and interaction triggering marks according to an exemplary embodiment of this application. As shown in FIG. 6, a video stream of the target cloud game video includes a plurality of video frames, such as a video frame 1, a video frame 2, . . . , and a video frame 8. Each video frame is used for reflecting corresponding video content of the target cloud game in a certain game progress. For example, the video frame 1 reflects video content of the target cloud game in a game progress 1 (for example, video content formed by a trial play operation performed by the player on a game page corresponding to the game progress 1 of the target cloud game), the video frame 2 reflects video content of the target cloud game in a game progress 2, and so on. The archives are files formed by saving these video frames. For example, an archive 1 is a file formed by saving the video frame 2, then the archive 1 may use a thumbnail of the video frame 2 as a key image of the archive 1 to identify the archive 1; in another example: an archive 2 is a file formed by saving the video frame 5, then the archive 5 may use a thumbnail of the video frame 5 as a key image of the archive 5 to identify the archive 5; and so on. Because each video frame reflects video content of the target cloud game in a certain game progress, an archive of each video frame corresponds to a corresponding game progress in the target cloud game. For example, the archive 1 corresponds to the game progress 2 of the target cloud game, the archive 2 corresponds to a game progress 5 of the target cloud game, an archive 3 corresponds to a game progress 8 of the target cloud game, and so on. In this embodiment, a value of N may be set according to an actual situation. A larger value of N indicates a greater quantity of archives and greater storage pressure on the cloud.

The quantity of archives of the target cloud game videos is the same as the quantity of interaction triggering marks of the target cloud game, both being N. The $i^{th}$ archive in the N archives is associated with the $i^{th}$ interaction triggering mark in the N interaction triggering marks. The association relationship herein means that: the game progress in the target cloud game corresponding to the $i^{th}$ archive is the same as the game progress in the target cloud game linked by the $i^{th}$ interaction triggering mark. For example, as shown in FIG. 6, the archive 1 is associated with an interaction triggering mark 1, the archive 1 corresponds to the game progress 2 of the target cloud game, and the interaction triggering mark 1 is also linked to the game progress 2 in the target cloud game. In another example, the archive 2 is associated with an interaction triggering mark 2, the archive 2 corresponds to the game progress 5 of the target cloud game, and the interaction triggering mark 2 is also linked to the game progress 5 in the target cloud game. In another example, the archive 3 is associated with an interaction triggering mark 3, the archive 3 corresponds to the game progress 8 of the target cloud game, and the interaction triggering mark 3 is also linked to the game progress 8 in the target cloud game.

Figure 7:
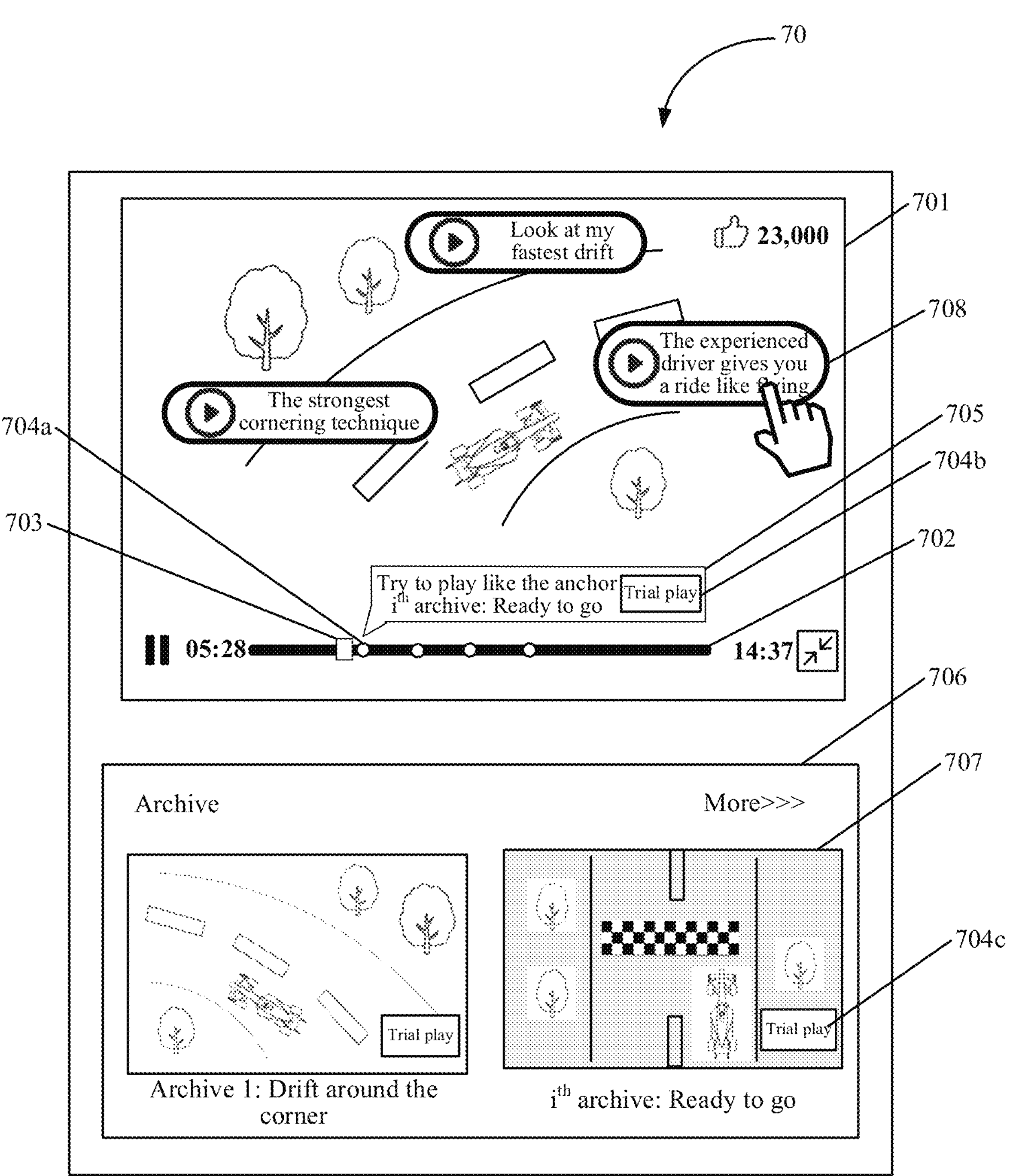
FIG. 7 is a schematic diagram of a page of a target cloud game video according to an exemplary embodiment of this application.
Figure 8:
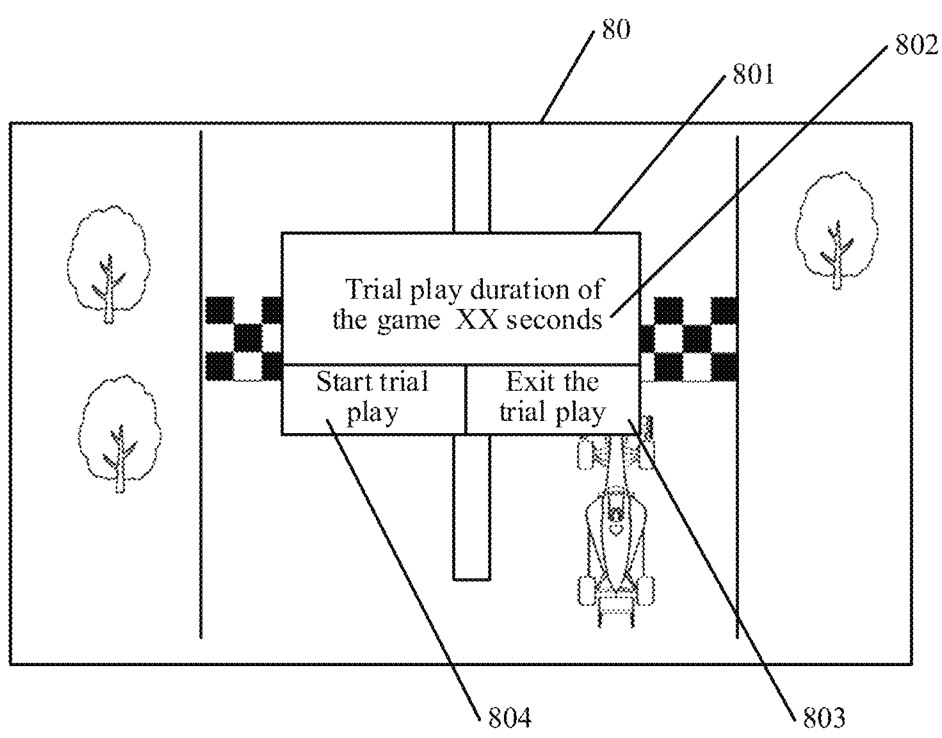
FIG. 8 is a schematic diagram of a game page of a target cloud game according to an exemplary embodiment of this application.

In an embodiment, the page of the target cloud game video includes a play window, the play window being used for playing the target cloud game video; and the play window includes a play progress indicator axis, the $i^{th}$ interaction triggering mark being set in the play progress indicator axis. FIG. 7 is a schematic diagram of a page of a target cloud game video according to an exemplary embodiment of this application. As shown in FIG. 7, a page 70 of the target cloud game video includes a play window 701, and the target cloud game video is being played in the play window 701; the play window 701 includes a play progress indicator axis 702, the play progress indicator axis 702 includes a progress pointer 703, and the progress pointer 703 points to a video frame being played in the play window 701. For example, if the video frame 2 of the target cloud game video is currently played in the play window 701, the progress pointer 703 is located at a play position in the play progress indicator axis 702 corresponding to the video frame 2, to point to the currently played video frame 2. Referring to FIG. 7, there are a plurality of small dots on the play progress indicator axis 702, and one small dot represents one interaction triggering mark. For example, a small dot **704*a* in the figure represents the $i^{th}$ interaction triggering mark. FIG. 8 is a schematic diagram of a game page of a target cloud game according to an exemplary embodiment of this application. When the small dot 704*a* is clicked, it means that the $i^{th}$ interaction triggering mark is selected, and then the target cloud game is triggered to start, and a game page 80 of the game progress linked by the $i^{th}$ interaction triggering mark shown in FIG. 8 is displayed. It may be understood that the interaction triggering marks in the play progress indicator axis 702 being presented in the form of small dots is only an example, and there are other presentation forms. For example, the interaction triggering marks in the play progress indicator axis 702 may be presented in other shapes (such as squares and irregular polygons). In another example, the interaction triggering marks in the play progress indicator axis 702 may alternatively be presented as special color blocks (such as red blocks and green blocks). The presentation form of the interaction triggering marks set in the play progress indicator axis 702** is not limited in this application.

It may be understood that the page of the target cloud game video may further include other content, including, but not limited to: anchor information, introduction information of the target cloud game, a bullet comment input box, other function buttons such as a like button shown in FIG. 7 (a thumb icon in the figure), and the corresponding quantity of likes (23,000 shown in the figure), and the player may like the target cloud game video by using the like button.

In another embodiment, the page of the target cloud game video includes a play window, the play window being used for playing the target cloud game video, the play window including a play progress indicator axis, the $i^{th}$ archive being corresponding to a play position in the play progress indicator axis; and a prompt box of the $i^{th}$ archive is displayed in the play window when a progress pointer in the play progress indicator axis points to the play position corresponding to the $i^{th}$ archive, the $i^{th}$ interaction triggering mark being set in the prompt box of the $i^{th}$ archive. As shown in FIG. 7, because the archives are files formed by saving video frames, and each video frame corresponds to one play position in the play progress indicator axis 702, correspondingly, each archive also corresponds to one play position in the play progress indicator axis 702. When the progress pointer 703 in the play progress indicator axis 702 points to the play position corresponding to the $i^{th}$ archive, it indicates that a video frame corresponding to the $i^{th}$ archive is currently played in the play window 701. In this case, a prompt box 705 of the $i^{th}$ archive shown in FIG. 7 is displayed in the play window 702, and prompt information is displayed in the prompt box 705 of the $i^{th}$ archive. The prompt information includes guidance prompt content, for example, "Try to play like the anchor", and further includes a related introduction of the $i^{th}$ archive, for example, a name "Ready to go" of the $i^{th}$ archive. It may be understood that the progress pointer 703 moves left and right along the play progress indicator axis 702 along with the playback of the target cloud game video. When the target cloud game video is played to the video frame corresponding to the $i^{th}$ archive, the progress pointer 703 exactly reaches the play position corresponding to the $i^{th}$ archive, thereby triggering display of the prompt box 705 the $i^{th}$ archive. Certainly, the progress pointer 703 may alternatively be actively dragged by the player to the play position corresponding to the $i^{th}$ archive, thereby triggering display of the prompt box 705 of the $i^{th}$ archive. An $i^{th}$ interaction triggering mark 704*b* is set in the prompt box 705 of the $i^{th}$ archive, and there may be a plurality of presentation forms of the $i^{th}$ interaction triggering mark 704*b*, for example, being presented as a text box shown in the figure, or being presented as an icon. The presentation form of the interaction triggering mark 704*b* is also not limited in this application. When the $i^{th}$ interaction triggering mark 704*b* is clicked, it means that the $i^{th}$ interaction triggering mark is selected, and then the target cloud game is triggered to start, and a game page 80 of the game progress linked by the $i^{th}$ interaction triggering mark shown in FIG. 8 is displayed.

Further, the prompt box of the $i^{th}$ archive is closed in the play window when the progress pointer in the play progress indicator axis is away from the play position corresponding to the $i^{th}$ archive and a display duration of the prompt box of the $i^{th}$ archive reaches a set duration. Herein, the set duration may be set according to an actual situation. For example, the set duration is 2 seconds or 5 seconds. By setting the duration to control a display duration of the prompt box of the $i^{th}$ archive, an impact of a long-time prompt on the playback effect of the target cloud game video can be avoided, and the waste of display resources caused by long-time unnecessary prompt display can also be avoided. Referring to FIG. 7, it may be understood that if the progress pointer 703 in the play progress indicator axis 702 always points to the play position corresponding to the $i^{th}$ archive, for example, the progress pointer 703 is paused at the play position corresponding to the $i^{th}$ archive and does not move, then it indicates that the player is interested in the video frame corresponding to the $i^{th}$ archive, and the prompt box of the $i^{th}$ archive may be displayed all the time, to guide the player to enter a corresponding game progress of the target cloud game in which the player is interested for cloud trial play.

In another embodiment, the page of the target cloud game video includes an archive display region, a key image of the $i^{th}$ archive being displayed in the archive display region, the $i^{th}$ interaction triggering mark being set in the key image of the $i^{th}$ archive. As shown in FIG. 7, key images of a plurality of archives are displayed in the archive display region 706, including a key image 707 of the $i^{th}$ archive. The key image 707 of the $i^{th}$ archive may be a thumbnail of the video frame corresponding to the $i^{th}$ archive. An $i^{th}$ interaction triggering mark 704*c* is displayed in the key image 707 of the $i^{th}$ archive. There may be a plurality of presentation forms of the $i^{th}$ interaction triggering mark 704*c*, for example, being presented as a text box shown in the figure, or being presented as an icon, or even being a transparent layer covering on the key image 707. The presentation form of the interaction triggering mark 704*c* is also not limited in this application. When the $i^{th}$ interaction triggering mark 704*b* is clicked, it means that the $i^{th}$ interaction triggering mark is selected, and then the target cloud game is triggered to start, and a game page 80 of the game progress linked by the $i^{th}$ interaction triggering mark shown in FIG. 8 is displayed.

Figure 9:
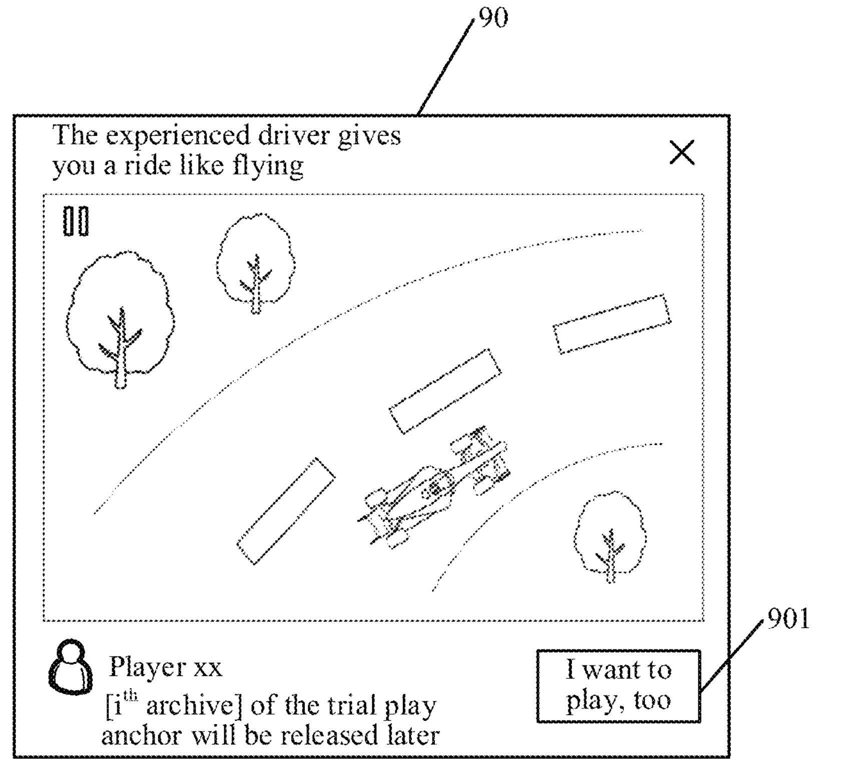
FIG. 9 is a schematic diagram of a playback page of a cloud trial play video according to an exemplary embodiment of this application.

In another embodiment, the page of the target cloud game video includes a play window, the play window being used for playing the target cloud game video, a cloud comment being displayed in the play window during playback of the target cloud game video, the cloud comment being a comment released for a cloud trial play video after the target cloud game is entered from the game progress corresponding to the $i^{th}$ archive and trial play is performed; and the cloud trial play video is played when the cloud comment is selected, the $i^{th}$ interaction triggering mark being set in a playback page of the cloud trial play video. As shown in FIG. 7, there are a plurality of cloud comments displayed in the play window 701, such as "Look at my fastest drift", "The strongest cornering technique", and "The experienced driver gives you a ride like flying" displayed in the form of bullet comments in the figure. When a cloud comment 708 thereof is clicked, a playback page of the cloud trial play video corresponding to the cloud comment 708 is displayed in a jump. FIG. 9 is a schematic diagram of a playback page of a cloud trial play video according to an exemplary embodiment of this application. As shown in FIG. 9, a playback page 90 of the cloud trial play video includes an $i^{th}$ interaction triggering mark 901, and there may be a plurality of presentation forms of the $i^{th}$ interaction triggering mark 901, for example, being presented as a text box shown in the figure, or being presented as an icon. The presentation form of the interaction triggering mark 901 is also not limited in this application. When the $i^{th}$ interaction triggering mark 901 is clicked, it means that the $i^{th}$ interaction triggering mark is selected, and then the target cloud game is triggered to start, and a game page 80 of the game progress linked by the $i^{th}$ interaction triggering mark shown in FIG. 8 is displayed.

As described in the foregoing embodiments, the $i^{th}$ interaction triggering mark associated with the $i^{th}$ archive may be presented in a plurality of forms such as 704*a*, 704*b*, 704*c*, and 901. In the page of the target cloud game video, the $i^{th}$ interaction triggering mark be displayed in any one of the foregoing presentation forms, and may alternatively be simultaneously displayed in a plurality of presentation forms. For example, as shown in FIG. 7, when a comment function in the play window 701 is turned off, no cloud comment is displayed in the play window 701. In this case, the $i^{th}$ interaction triggering mark cannot be displayed in the presentation form shown in 901, but any one or more other presentation forms can be selected to display the $i^{th}$ interaction triggering mark. As shown in FIG. 7, when the play window 701 is played in full screen, the play window 701 is filled with the entire page of the target cloud game video, and then the archive display region 706 is blocked. In this case, only the presentation form shown in 704*a* can be used to display the $i^{th}$ interaction triggering mark, or both the presentation forms shown in 704*a* and 704*b* are used to display the $i^{th}$ interaction triggering mark.

In an embodiment, the page of the target cloud game video includes a play window and an archive display region, the play window being used for playing the target cloud game video, the play window including a play progress indicator axis, the $i^{th}$ archive being corresponding to a play position in the play progress indicator axis, and a key image of the $i^{th}$ archive being displayed in the archive display region; and when a progress pointer in the play progress indicator axis points to the play position corresponding to the $i^{th}$ archive, the key image of the $i^{th}$ archive in the archive display region is highlighted.

The highlighting includes: the key image of the $i^{th}$ archive in the archive display region being displayed in a first color, and regions other than the key image of the $i^{th}$ archive being displayed in a second color; or the key image of the $i^{th}$ archive in the archive display region being displayed at a first brightness, and regions other than the key image of the $i^{th}$ archive being displayed at a second brightness. For highlighting, the first color and the second color are different colors. For example, the first color is red, and the second color is black. Similarly, the first brightness level and the second brightness are also different brightnesses. For example, the first brightness level is higher than the second brightness. As shown in FIG. 7, when the progress pointer 703 points to the play position corresponding to the $i^{th}$ archive, the key image 707 of the $i^{th}$ archive in the archive display region 706 is displayed in grayscale to show a selected state, which can effectively prompt the player that the currently played video frame corresponds to an archive, thereby further guiding the player to enter the target cloud game for trial play through the interaction triggering mark associated with the $i^{th}$ archive.

In another embodiment, a cloud trial play prompt is displayed when the game page of the target cloud game is displayed starting from the game progress linked by the $i^{th}$ interaction triggering mark, the cloud trial play prompt including a remaining duration and an exit option; and countdown is started from the remaining duration, and when the remaining duration is counted as 0, the display of the game page of the target cloud game is stopped and the target cloud game is exited; or when the exit option is selected, the display of the game page of the target cloud game is stopped and the target cloud game is exited. As shown in FIG. 8, the game page 80 includes a cloud trial play prompt box 801, and the cloud trial play prompt box 801 includes a remaining duration 802 and a trial play exit option 803. When the remaining duration 802 prompts that the time left is 0, or the exit trial play option 803 is selected, the terminal device stops displaying the game page of the target cloud game and exits the target cloud game, and the current trial play process of the player for the target cloud game ends. The cloud trial play prompt box 801 may further include other options. For example, as shown in FIG. 8, when the display of the game page 80 of the game progress of the target cloud game starts, the cloud trial play prompt box 801 may further include a "start trial play" option 804. When the "start trial play" option 804 is clicked, the cloud trial play prompt box 801 is closed, and a cloud trial play process starts to be entered.

Figure 10:
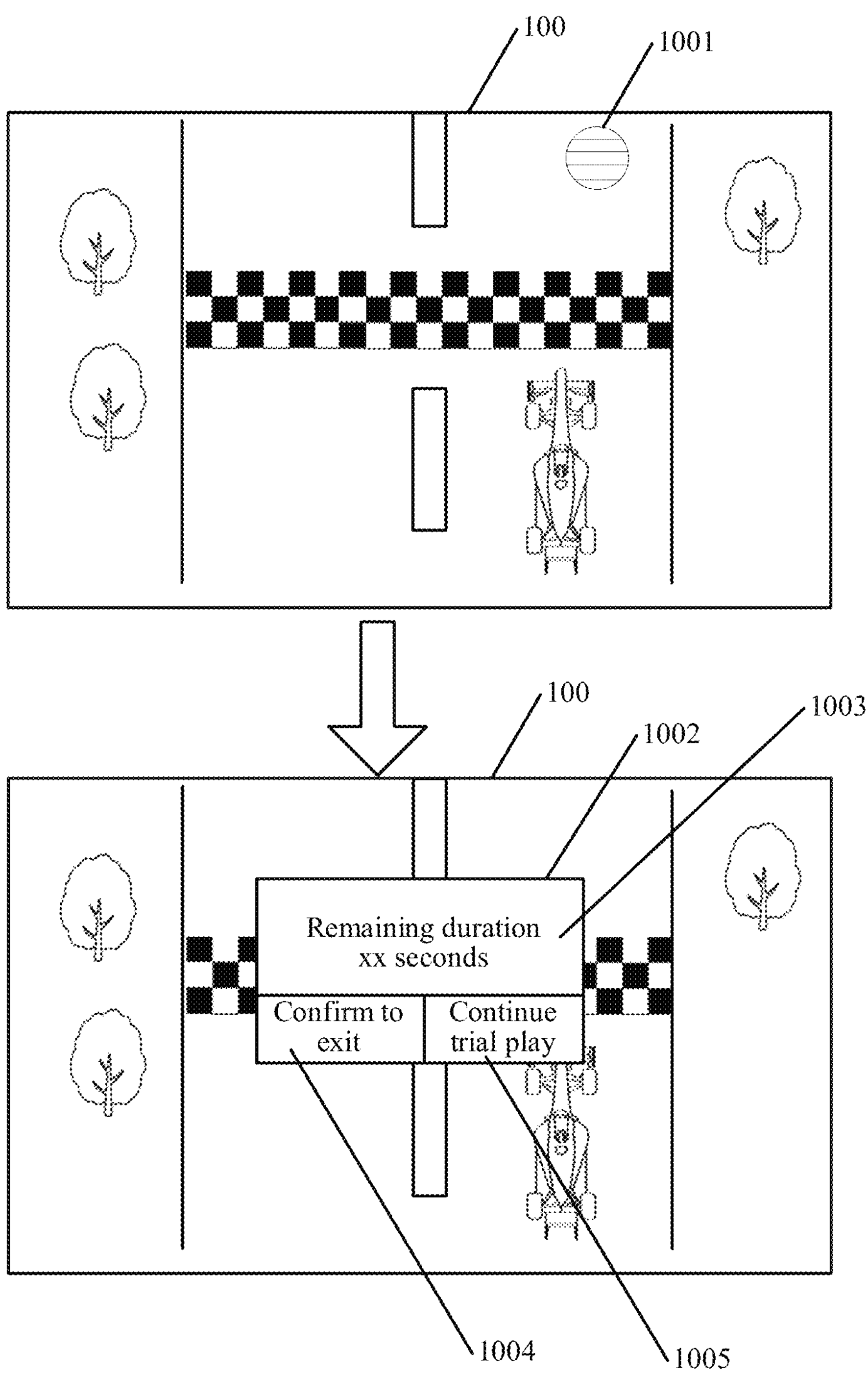
FIG. 10 is a schematic diagram of a game page of a target cloud game according to an exemplary embodiment of this application.

FIG. 10 is a schematic diagram of a game page of a target cloud game according to an exemplary embodiment of this application. A game page 100 shown in FIG. 10 is any game page displayed in a cloud trial play process after the game page 80. In order not to affect the cloud trial play, the cloud trial play prompt box is hidden in the form of a floating ball 1001 during the cloud trial play. The floating ball may be displayed at any position of the game page 100. When the floating ball 1001 is clicked, a cloud trial play prompt box 1002 is triggered to be displayed. The cloud trial play prompt box 1002 also includes a remaining duration 1003 and an exit option (that is, a "sure to exit" option 1004), and may further include a "continue trial play" option 1005. When the remaining duration 1003 prompts that the time left is 0, or when the sure to exit option 1004 is selected, the terminal device stops displaying the game page of the target cloud game and exits the target cloud game, and the current trial play process of the player for the target cloud game ends. When the remaining duration 1003 prompts that the time left is not 0, or the sure to exit option 1004 is not selected, by clicking the continue trial play option 1005, the cloud trial play prompt box 1002 can be closed, and the cloud trial play process continues.

From displaying the game page 80 of the target cloud game shown in FIG. 8 starting from the game progress linked by the $i^{th}$ interaction triggering mark to stopping displaying the game page of the target cloud game and exiting the target cloud game (that is, ending the cloud trial play process), the player may perform a trial play operation in the game page. The trial play operation and the entire trial play process are recorded by the cloud server and a cloud trial play video of the player is generated. The cloud trial play video is stored in the cloud server.

In another embodiment, if the player intends to perform operations such as clipping and sharing on the cloud trial play video thereof, the virtual scene interaction method shown in FIG. 5 further includes the following steps S503-S506:

S503: Display a cloud clipping page, and play a cloud trial play video in the cloud clipping page, the cloud clipping page including a selection box and an information input box, the cloud trial play video being a video generated according to a received cloud trial play operation performed on the target cloud game from displaying the game page of the target cloud game starting from the game progress linked by the $i^{th}$ interaction triggering mark to stopping displaying the game page of the target cloud game and exiting the target cloud game.

S504: Obtain a selected video clip from the cloud trial play video by using the selection box, and obtain comment information by using the information input box.

Figure 11A:
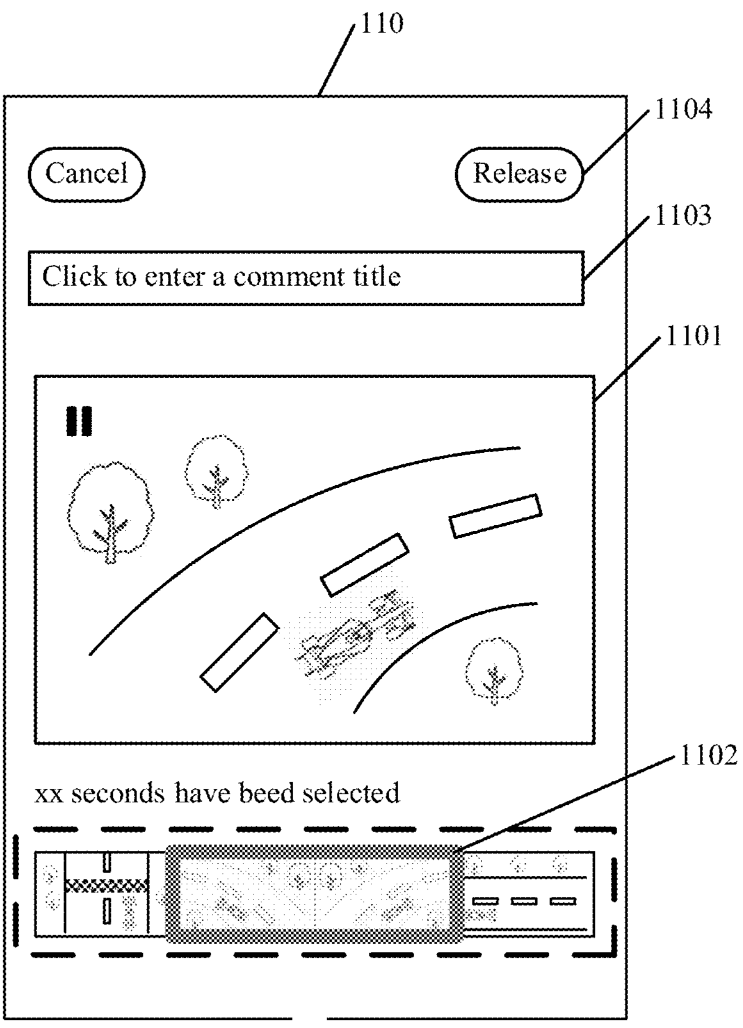
FIG. 11*a* is a schematic diagram of a cloud clipping page according to an exemplary embodiment of this application.
Figure 11B:
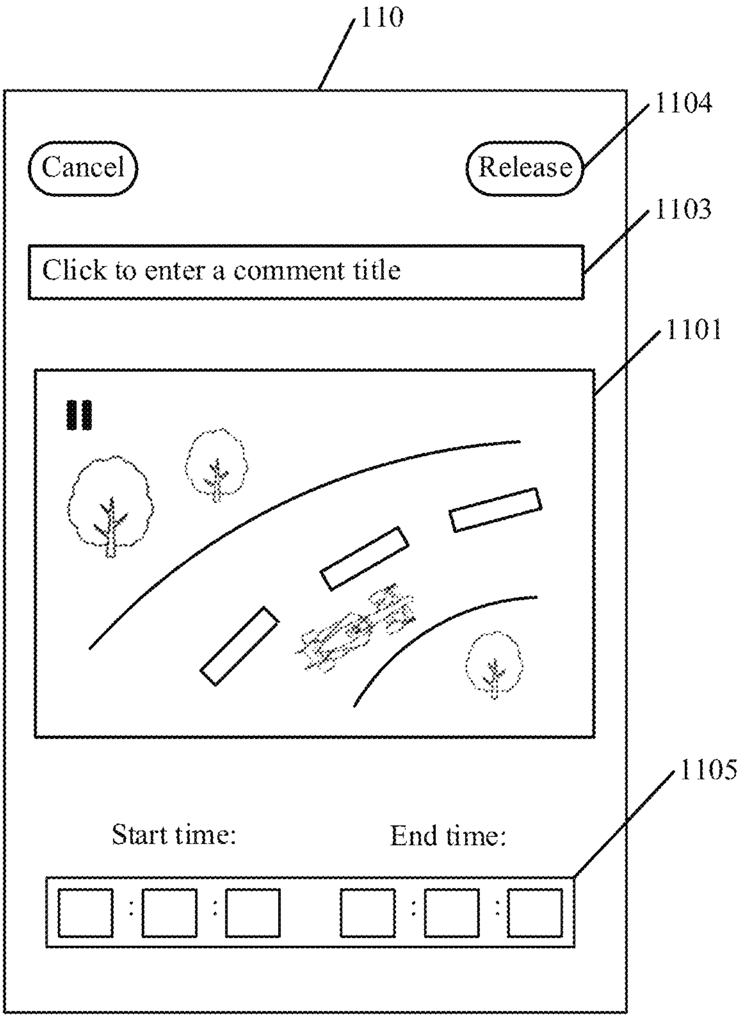
FIG. 11*b* is a schematic diagram of a cloud clipping page according to another exemplary embodiment of this application.

FIG. 11*a* and FIG. 11*b* are schematic diagrams of a cloud clipping page according to an exemplary embodiment of this application. As shown in FIG. 11*a* or FIG. 11*b*, the cloud clipping page 110 includes a play window 1101, a comment information input box 1103, and a release control 1104. The play window 1101 is configured to play a cloud trial play video; and the comment information input box 1103 is configured to receive comment information inputted by the player, such as a comment title, text, background music, and the like. The release control 1104 is configured to release a cloud comment. As shown in FIG. 11*a*, the cloud clipping page 110 further includes a selection control 1102. The selection control 1102 may be configured to select the target cloud video. As shown in FIG. 11*a*, the selection control 1102 may be configured to cut a video frame of the target cloud video by sliding left and right to obtain a selected video clip. In addition, the size of the selection control 1102 may be adjusted in left and right. As shown in FIG. 11*b*, the cloud clipping page 1101 may also include a selection control 1105. The selection control 1105 is a time input box, and obtains a selected video clip by inputting the start and end time of the selected video clip.

S505: Display a cloud comment in the play window of the target cloud game video when the release control is clicked, the cloud comment being generated according to the selected video clip and the comment information.

As shown in FIG. 11*a* or FIG. 11*b*, the release control 1104 is configured to release a cloud comment. When the release control 1104 is clicked by the player, the terminal device requests the cloud server to release a cloud comment of the player; and the cloud server generates the cloud comment of the player according to the selected video clip and the comment information in the cloud clipping page, and returns the cloud comment to the terminal device. The terminal device displays the cloud comment in the play window of the target cloud game video. As shown in FIG. 7, the cloud comment 708 is displayed in the play window 701.

In one embodiment, the cloud comment may also include information such as the quantity of likes and comment popularity. In addition, the terminal device may further preview the cloud comment to be released in the play window 1101 of the cloud trial play video in the cloud clipping page. Affected by factors such as the network quality and the processing capability of the terminal device, if the terminal device fails to preview the cloud comment to be released, the terminal device may request the cloud server to clip the cloud trial play video again, regenerate a cloud comment, and replace the cloud comment that fails to be previewed by the terminal device with the regenerated cloud comment. The terminal device obtains the cloud comment after clipping again and replacement sent by the cloud server, and re-previews the cloud comment in the play window 1101 of the cloud trial play video. It may be understood that based on clipping again and replacement, the probability of abnormal cloud clipping can be further lowered, thereby improving the success rate, and avoiding the waste of system response resources caused by repeated operations.

S506: Play the selected video clip of the cloud trial play video when the cloud comment is selected.

As shown in FIG. 7, when the cloud comment 708 is selected, the playback page 90 of the cloud trial play video shown in FIG. 9 is displayed, and the selected video clip of the cloud trial play video is played on the playback page 90. Information of the cloud comment is further displayed in a playback page of the selected video clip, the information of the cloud comment including at least one of the following: an identifier of a publisher, an identifier of the cloud trial play video, an identifier of the selected video clip, an identifier of an $i^{th}$ archive corresponding to the cloud trial play video, a release time, and an attention level.

In another embodiment, the virtual scene interaction method shown in FIG. 5 further includes the following step S507:

S507: Display a cloud service page, a cloud video list being displayed in the cloud service page, the cloud video list including at least one cloud game video; and perform step S501 when the target cloud game video in the cloud service page is selected.

Figure 12:
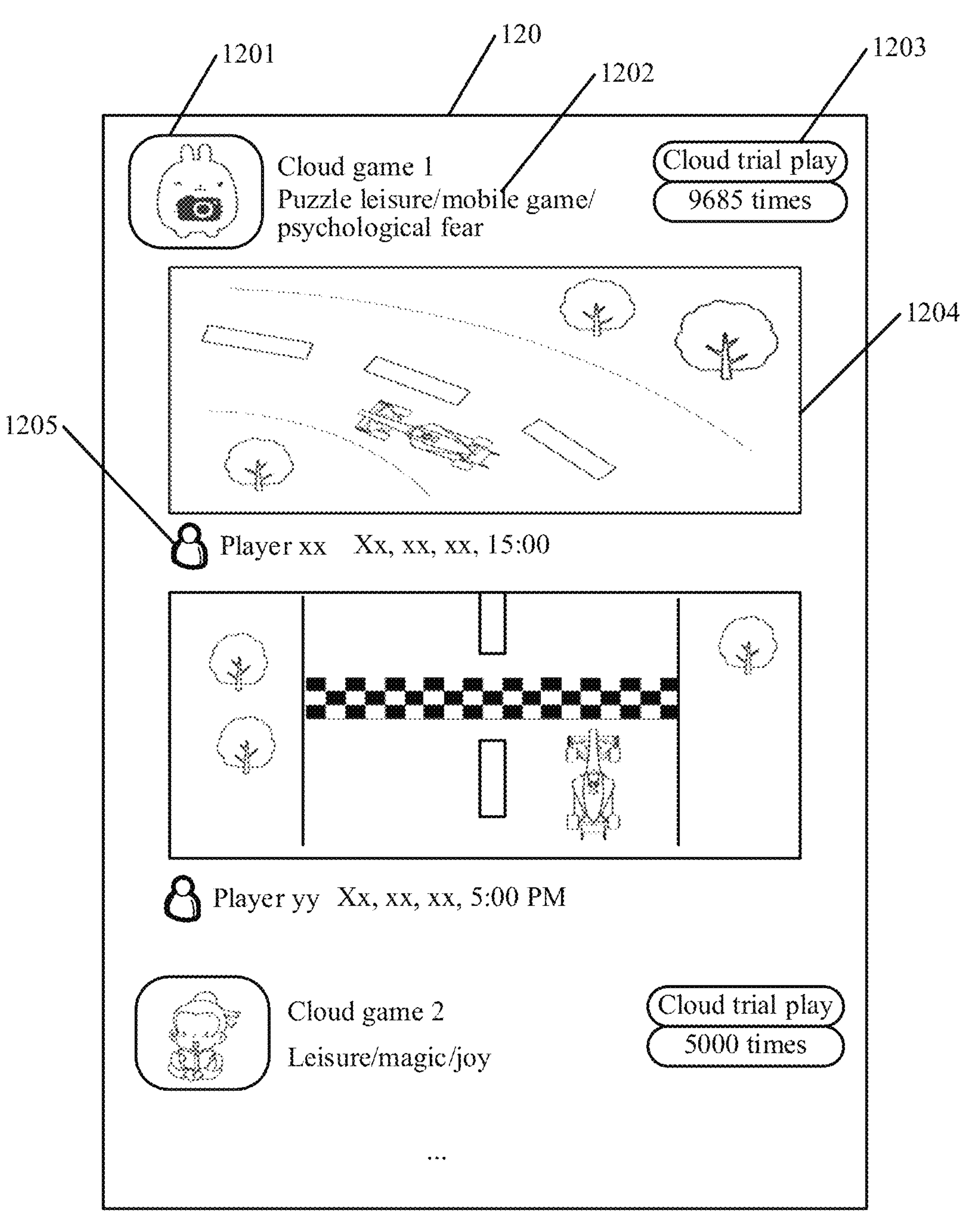
FIG. 12 is a schematic diagram of a cloud service page according to an exemplary embodiment of this application.

The cloud service page refers to a main service page displayed by a player entering a cloud game platform (such as a cloud game website or a cloud game APP). FIG. 12 is a schematic diagram of a cloud service page according to an exemplary embodiment of this application. The cloud service page 120 includes a cloud video list, and the cloud video list includes at least one cloud game video. As shown in FIG. 12, cloud game videos related to different cloud games may be distinctively displayed in the cloud service page 120. For example, an introduction column of a cloud game 1 is displayed in the figure, and the introduction column includes a key image 1201 of the cloud game 1. The key image may be a thumbnail of any game picture in the cloud game 1. The introduction column further includes a name and attributes of the cloud game 1, and the attributes may include, but not limited to: a class (such as the puzzle class or the leisure class), a running environment (for example, the mobile game runs in a mobile terminal environment), and content nature (such as psychological fear and joy). The introduction column may further include the quantity of times 1203 of cloud trial play on the cloud game 1, and the quantity of times is updated in real time as new cloud trial play is performed on the cloud game 1. At least one cloud game video related to the cloud game 1 is displayed below the introduction column of the cloud game 1, including a cloud game video 1204; in addition, a release attribute 1205 of the cloud game video 1204 is also displayed, the release attribute 1205 including, but not limited to, a publisher identifier (for example, a player xx), a video release time, a video name, and the like. When any cloud game video in the cloud service page 120 is clicked, a page of the clicked cloud game video is jumped to. For example, the cloud game 1 is set as the target cloud game; and when the cloud game video 1204 is clicked, the terminal device jumps to the page 70 of the target cloud game video shown in FIG. 7 for display.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations. In addition, this embodiment of this application supports cloud clipping; the clipping process occurs in the cloud; and the terminal device does not need to download or record the cloud trial play video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

Figure 13:
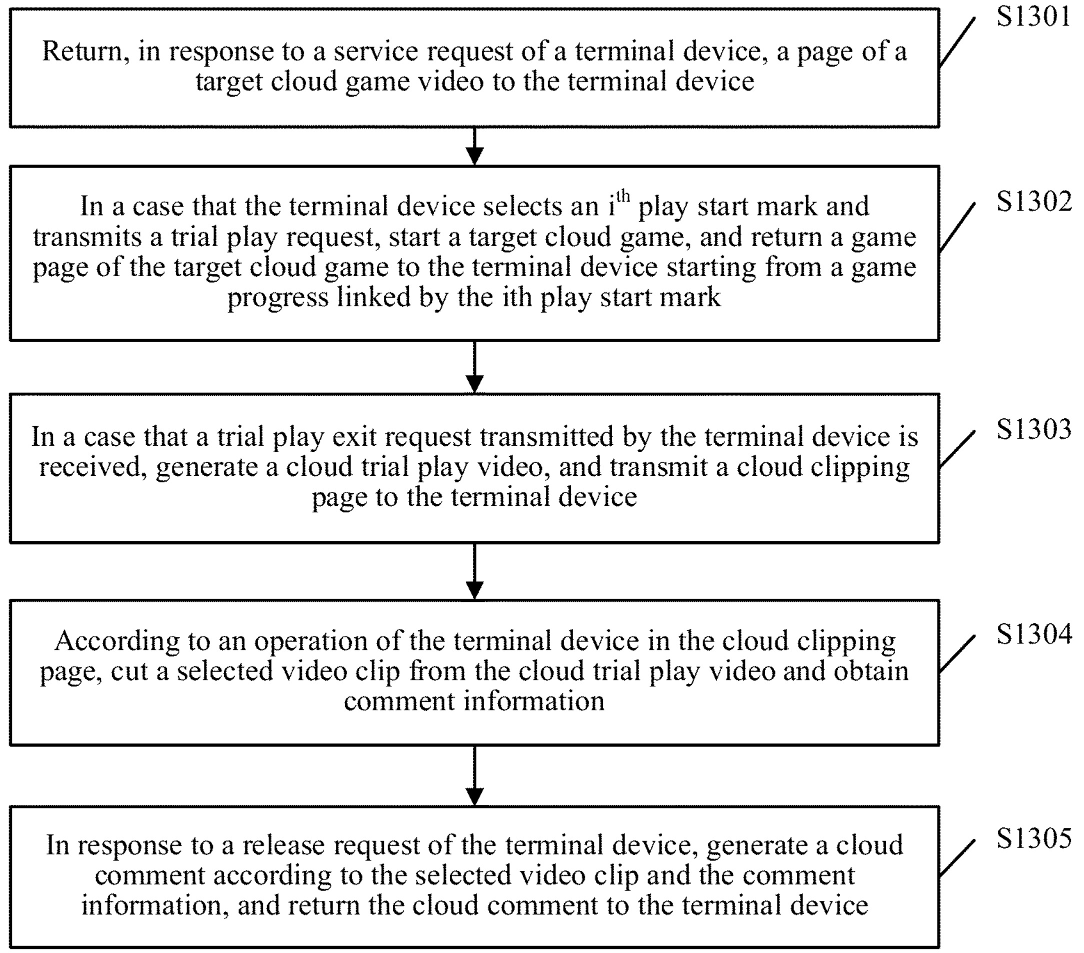
FIG. 13 is a flowchart of a virtual scene interaction method according to another exemplary embodiment of this application.

FIG. 13 is a flowchart of a virtual scene interaction method according to another exemplary embodiment of this application. The virtual scene interaction method may be performed by the terminal device 202 shown in FIG. 2. As shown in FIG. 13, the virtual scene interaction method includes the following steps S1301 to S1302:

S1301: Return, in response to a service request of a terminal device, a page of a target cloud game video to the terminal device, the page of the target cloud game video including N interaction triggering marks of a target cloud game, an $i^{th}$ interaction triggering mark in the N interaction triggering marks being used for linking to a game progress in the target cloud game, both i and N being positive integers, and $i \leq N$.

The service request may be sent by the terminal device to the cloud server when the terminal device detects that the target cloud game video displayed in the cloud service page is clicked. For example, when the target cloud game video 1204 shown in FIG. 12 is clicked, the terminal device sends a service request to the cloud server, to request obtaining of the page of the target cloud game video.

S1302: When the terminal device selects the $i^{th}$ interaction triggering mark and transmits a trial play request, start the target cloud game, and return a game page of the target cloud game to the terminal device starting from the game progress linked by the $i^{th}$ interaction triggering mark.

For the game page of the game progress linked by the $i^{th}$ interaction triggering mark, reference may be made to the game page 80 shown in FIG. 8. During the cloud trial play of the player, the cloud server still continues to return the game page 100 shown in FIG. 10 to the terminal device. The terminal device displays these game pages, which is specifically: displaying game pictures of these game pages, and simultaneously playing sound effects in these game pages. The player may perform a trial play operation in these game pages, and the trial play operation is sent by the terminal device to the cloud server. The cloud server records the entire trial play process in response to the trial play operation of the player.

In this embodiment of this application, the cloud server sends the page of the target cloud game video to the terminal device, and based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations.

In an embodiment, the virtual scene interaction method further includes the following step S1303 to S1305:

S1303: When a trial play exit request transmitted by the terminal device is received, generate a cloud trial play video, and transmit a cloud clipping page to the terminal device;

The trial play exit request is sent when the remaining duration in the game page 80 or the game page 100 displayed by the terminal device is prompted as 0, or when the exit option is selected. When receiving a trial play exit request sent by the terminal device, the cloud server stops recording the cloud trial play process of the player and stops sending the game page to the terminal device, so that the terminal device stops displaying the game page of the target cloud game and exits the target cloud game, and the current trial play process of the player for the target cloud game ends. The cloud server generates a cloud trial play video of the player according to the recorded cloud trial play process, and the cloud trial play video is stored in the cloud server. When the player has a clipping need, the cloud server sends the cloud clipping page to the terminal device. The player may perform a clipping operation on the cloud trial play video in the cloud clipping page to select a selected video clip that the player intends to save or share, and may input comment information in the cloud clipping page.

S1304: According to an operation of the terminal device in the cloud clipping page, cut a selected video clip from the cloud trial play video and obtain comment information.

S1305: In response to a release request of the terminal device, generate a cloud comment according to the selected video clip and the comment information, and return the cloud comment to the terminal device.

The release request is sent by the terminal device when the terminal device detects that the release control shown in FIG. 11*a* or FIG. 11*b* is triggered. The cloud server generates a cloud comment based on the selected video clip and the comment information, the cloud comment being a visualized comment presented in the form of a video. The cloud server sends the cloud comment to the terminal device, and the terminal device releases the cloud comment in the page of the target cloud game video. The cloud comment may be, for example, the cloud comment 708 shown in FIG. 7.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations. In addition, this embodiment of this application supports cloud clipping; the clipping process occurs in the cloud; and the terminal device does not need to download or record the cloud trial play video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

Figure 14:
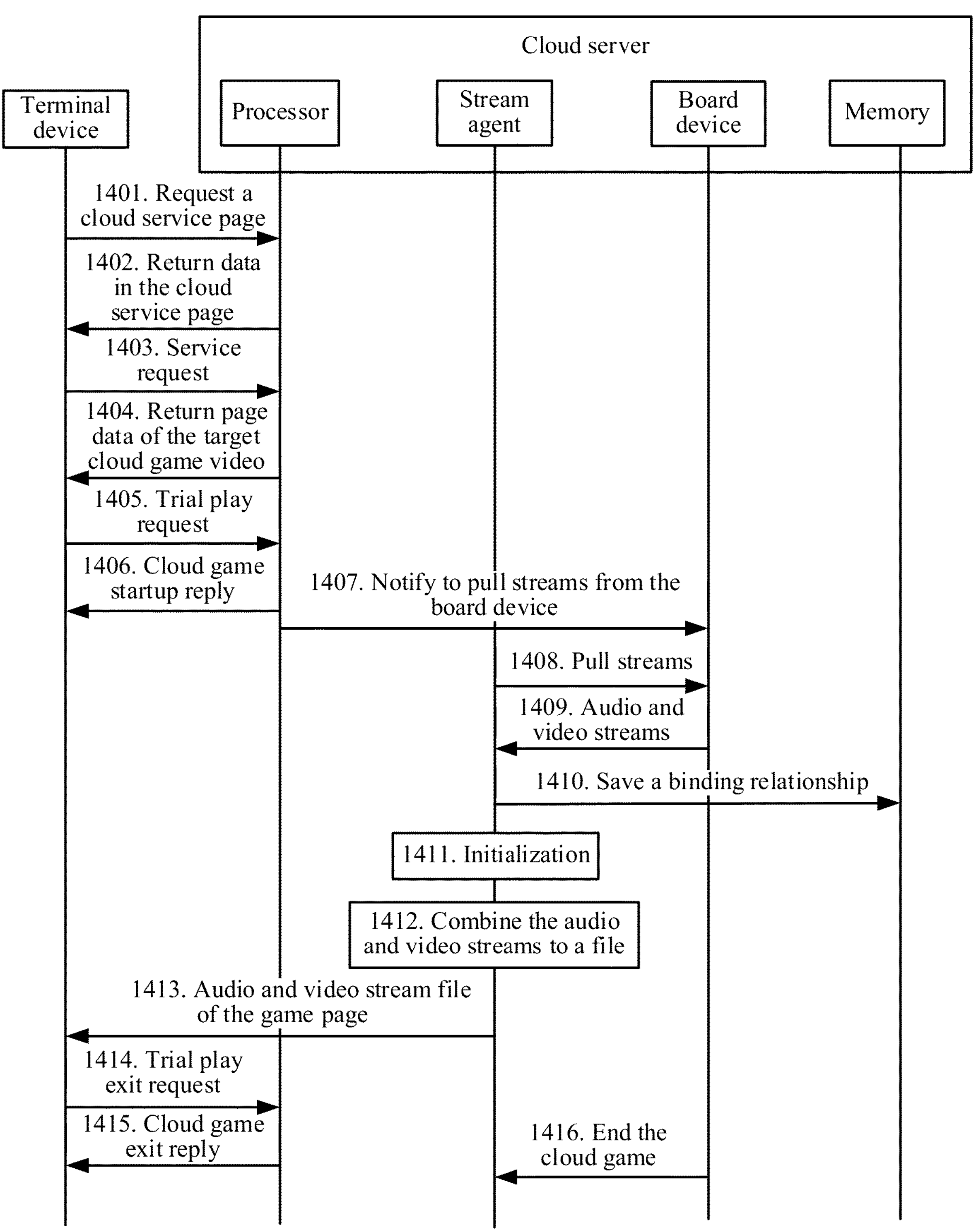
FIG. 14 is a flowchart of another virtual scene interaction method according to another exemplary embodiment of this application.

FIG. 14 is a flowchart of another virtual scene interaction method according to another exemplary embodiment of this application. The virtual scene interaction method may be performed interactively by the terminal device 201 and the cloud server 202 shown in FIG. 2. As shown in FIG. 14, the cloud server includes a processor, a stream agent, a board device, and a memory, and the virtual scene interaction method includes, but not limited to, the following steps 1401 to 1416.

1401. The terminal device requests a cloud service page from the processor.

1402. The processor returns data in the cloud service page to the terminal device. For the cloud service page, reference may be made to FIG. 12.

1403. The terminal device sends a service request to the processor, to request obtaining of a page of a target cloud game video.

1404. The processor returns page data of the target cloud game video to the terminal device. For the page of the target cloud game video, reference may be made to FIG. 7.

1405. The terminal device sends a trial play request to the processor, the trial play request being sent after an $i^{th}$ interaction triggering mark is triggered.

1406. The processor returns a cloud game startup reply to the terminal device, so that the terminal device starts a target cloud game.

1407. The processor notifies the stream agent to pull streams from the board device, to pull audio and video streams required in a game page of a game progress linked by the $i^{th}$ interaction triggering mark in the target cloud game.

1408. The stream agent sends a pull-stream instruction to the board device.

1409. The board device returns the required audio and video streams to the stream agent.

1410. The stream agent notifies the memory to store a binding relationship between the terminal device, the processor, the stream agent, and the board device.

In one embodiment, the memory may perform storage using the key-value (KV) method, storing an identifier of the terminal device as key, and storing an identifier of the processor, an identifier of the stream agent, and an identifier of the board device that are bound to the identifier of the terminal device as value. The value may be quickly obtained through the key.

1411. The stream agent performs initialization.

The purpose of the initialization is to advance the target cloud game to the game progress linked by the $i^{th}$ interaction triggering mark, so that the terminal device may directly display the game page of the game progress without displaying various pages before the game progress.

1412. The stream agent combines the audio streams and the video streams to form an overall file.

Generally, the audio streams and the video streams are transmitted by using different channels. After the stream agent pulls audio and video streams of the same game page by using different channels, stream combination needs to be performed to ensure a normal display output of the game page.

1413. The stream agent returns an audio and video stream file of the corresponding game page to the terminal device.

1414. The terminal device sends a trial play exit request to the processor.

1415. The processor responds and returns a cloud game exit reply.

1416. The board device no longer sends audio and video streams to the stream agent, to end the cloud game.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations.

Figure 15:
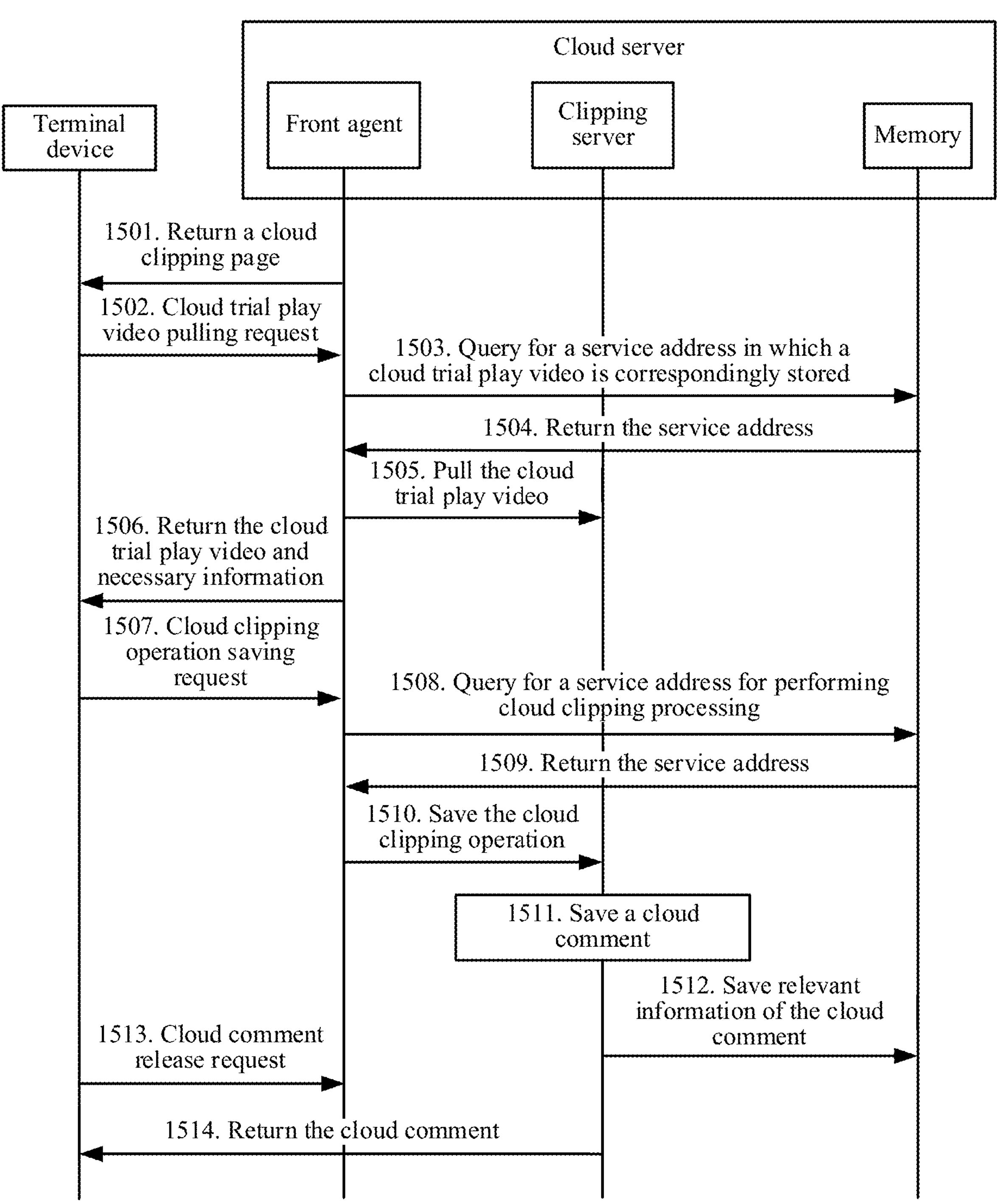
FIG. 15 is a flowchart of a virtual scene interaction method according to another exemplary embodiment of this application.

FIG. 15 is a flowchart of a virtual scene interaction method according to another exemplary embodiment of this application. The virtual scene interaction method may be performed interactively by the terminal device 201 and the cloud server 202 shown in FIG. 2. As shown in FIG. 15, the cloud server includes a front agent, a clipping server, and a memory, and the virtual scene interaction method includes, but not limited to, the following steps 1501 to 1514.

1501. The front agent returns a cloud clipping page to the terminal device.

The front agent may automatically return the cloud clipping page to the terminal device after the terminal device exits cloud trial play, to guide a player to perform a cloud clipping operation and a cloud comment operation. Certainly, the terminal device may also actively request to obtain the cloud clipping page after exiting the cloud trial play, and the front agent returns the cloud clipping page to the terminal device in response to the request of the terminal device.

1502. The terminal device sends a cloud trial play video pulling request to the front agent.

1503. The front agent queries the memory for a service address in which a cloud trial play video is correspondingly stored.

1504. The front agent receives the service address in which the cloud trial play video is correspondingly stored that is returned by the memory, in this embodiment, the service address in which the cloud trial play video is correspondingly stored being located in the clipping server.

1505. The front agent pulls the cloud trial play video from the clipping server according to the service address in which the cloud trial play video is correspondingly stored.

1506. The front agent returns the cloud trial play video and necessary information to the terminal device. The necessary information is some information required for cloud clipping, and may include, but not limited to, a duration of the cloud trial play video, a screenshot list formed in sequence by screenshots corresponding to video frames in the cloud trial play video, and the like.

1507. The terminal device sends a save request to the front agent, to request to save a cloud clipping operation obtained in the cloud clipping page.

1508. The front agent queries the memory for a service address for performing cloud clipping processing.

1509. The memory returns the service address for performing cloud clipping processing to the clipping agent, the service address pointing to the clipping server.

1510. The front agent saves the cloud clipping operation through the clipping server.

1511. The clipping server generates and saves a cloud comment during saving of the cloud clipping operation.

1512. The clipping server sends relevant information of the cloud comment to the memory for saving. The relevant information of the cloud comment herein may include, but is limited to an identifier of a selected video clip obtained through the cloud clipping operation, comment information corresponding to the selected video clip, a cover address of the selected video clip, an identifier of the cloud trial play video to which the selected video clip belongs, and the like.

1513. The terminal device sends a cloud comment release request to the front agent.

1514. The clipping server returns the cloud comment to the terminal device through the front agent.

This embodiment of this application supports cloud clipping; the clipping process occurs in the cloud; and the terminal device does not need to download or record the cloud trial play video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

The foregoing describes the method in the embodiments of this application in detail. To facilitate better implementation of the foregoing solutions of the embodiments of this application, the following correspondingly provides apparatuses in the embodiments of this application.

Figure 16:
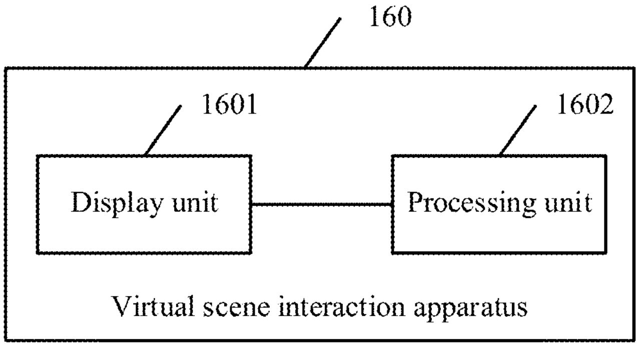
FIG. 16 is a schematic structural diagram of a virtual scene interaction apparatus according to an exemplary embodiment of this application.

FIG. 16 is a schematic structural diagram of a virtual scene interaction apparatus according to an exemplary embodiment of this application. In an embodiment, the virtual scene interaction apparatus may be carried on the terminal device in the foregoing method embodiments, for example, the terminal device 201 shown in FIG. 2. The virtual scene interaction apparatus 160 shown in FIG. 16 may be configured to perform some or all of the functions in the method embodiments described in the embodiments of this application. Detailed descriptions of the units are as follows:

a display unit 1601, configured to display a viewing page of a target cloud video, the viewing page of the target cloud video including N interaction triggering marks, an $i^{th}$ interaction triggering mark in the N interaction triggering marks being used for linking to an interaction progress in a virtual scene, both i and N being positive integers, and i≤N; and a processing unit 1602, configured to display, when the $i^{th}$ interaction triggering mark is selected, a control page for the virtual scene starting from the interaction progress linked by the $i^{th}$ interaction triggering mark.

In one embodiment, the target cloud video includes N archives, an $i^{th}$ archive in the N archives being associated with the $i^{th}$ interaction triggering mark.

In one embodiment, the viewing page of the target cloud video includes a play window, the play window being used for playing the target cloud video; and the play window includes a play progress indicator axis, the $i^{th}$ interaction triggering mark being set in the play progress indicator axis.

In one embodiment, the viewing page of the target cloud video includes a play window, the play window being used for playing the target cloud video, the play window including a play progress indicator axis, the $i^{th}$ archive being corresponding to a play position in the play progress indicator axis; and a prompt box of the $i^{th}$ archive is displayed in the play window when a progress pointer in the play progress indicator axis points to the play position corresponding to the $i^{th}$ archive, the $i^{th}$ interaction triggering mark being set in the prompt box of the $i^{th}$ archive.

In one embodiment, the processing unit 1602 is further configured to close the prompt box of the $i^{th}$ archive in the play window when the progress pointer in the play progress indicator axis is away from the play position corresponding to the $i^{th}$ archive and a display duration of the prompt box of the $i^{th}$ archive reaches a set duration.

In one embodiment, the viewing page of the target cloud video includes an archive display region, a key image of the $i^{th}$ archive being displayed in the archive display region, the $i^{th}$ interaction triggering mark being set in the key image of the $i^{th}$ archive.

In one embodiment, the viewing page of the target cloud video includes a play window, the play window being used for playing the target cloud video, a cloud comment being displayed in the play window during playback of the target cloud video, the cloud comment being a comment released after control is performed based on the control page and for a control cloud video generated based on the control; and the display unit 1601 is further configured to play the control cloud video when the cloud comment is selected, the $i^{th}$ interaction triggering mark being set in a playback page of the control cloud video.

In one embodiment, the viewing page of the target cloud video includes a play window and an archive display region, the play window being used for playing the target cloud video, the play window including a play progress indicator axis, the $i^{th}$ archive being corresponding to a play position in the play progress indicator axis, and a key image of the $i^{th}$ archive being displayed in the archive display region; and when a progress pointer in the play progress indicator axis points to the play position corresponding to the $i^{th}$ archive, the key image of the $i^{th}$ archive in the archive display region is highlighted.

In an embodiment, the highlighting includes: the key image of the $i^{th}$ archive in the archive display region being displayed in a first color, and regions other than the key image of the $i^{th}$ archive being displayed in a second color; or the key image of the $i^{th}$ archive in the archive display region being displayed at a first brightness, and regions other than the key image of the $i^{th}$ archive being displayed at a second brightness.

In one embodiment, the processing unit 1602 is further configured to display an interaction prompt when the control page for the virtual scene is displayed starting from the interaction progress linked by the $i^{th}$ interaction triggering mark, the interaction prompt including a remaining duration and an exit option; and starting countdown from the remaining duration, and when the remaining duration is counted as 0, stopping displaying the control page for the virtual scene and exiting the target cloud game; or when the exit option is selected, stopping displaying the control page for the virtual scene and exiting the target cloud game.

In one embodiment, the processing unit 1602 is further configured to: display a cloud clipping page, and play a control cloud video in the cloud clipping page, the cloud clipping page including a selection box and an information input box; and obtain a selected video clip from the control cloud video by using the selection box, and obtain comment information by using the information input box, the control cloud video being a video generated according to a received control operation performed based on the control page after displaying the control page for the virtual scene starting from the interaction progress linked by the $i^{th}$ interaction triggering mark to stopping displaying the control page for the virtual scene.

In one embodiment, the cloud clipping page further includes a release control; the viewing page of the target cloud video includes a play window, the play window being used for playing the target cloud video; and the processing unit 1602 is further configured to:

display a cloud comment in the play window when the release control is clicked, the cloud comment being generated according to the selected video clip and the comment information; and play the selected video clip of the control cloud video when the cloud comment is selected, information of the cloud comment being further displayed in a playback page of the selected video clip, the information of the cloud comment including at least one of the following: an identifier of a publisher, an identifier of the control cloud video, an identifier of the selected video clip, an identifier of an $i^{th}$ archive corresponding to the control cloud video, a release time, and an attention level.

In one embodiment, the processing unit 1602 is further configured to: display a cloud service page, a cloud video list being displayed in the cloud service page, the cloud video list including at least one cloud video; and notify, when the target cloud video in the cloud service page is selected, the display unit 1601 to display the viewing page of the target cloud video.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations. In addition, this embodiment of this application supports cloud clipping; the clipping process occurs in the cloud; and the terminal device does not need to download or record the control cloud video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

Based on the same inventive concept, the principle and beneficial effects of the virtual scene interaction apparatus provided in this embodiment of this application for solving problems are similar to the principle and beneficial effects of the virtual scene interaction method in the method embodiments of this application for solving problems, and reference may be made to the principle and beneficial effects of the implementation of the method. For brevity of the description, details are not described herein again.

Figure 17:
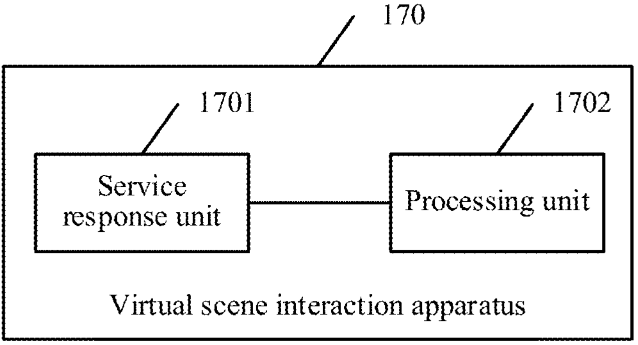
FIG. 17 is a schematic structural diagram of a virtual scene interaction apparatus according to an exemplary embodiment of this application.

FIG. 17 is a schematic structural diagram of a virtual scene interaction apparatus according to an exemplary embodiment of this application. In an embodiment, the virtual scene interaction apparatus may be carried on the cloud server in the foregoing method embodiments, for example, the cloud server 202 shown in FIG. 2. The virtual scene interaction apparatus 170 shown in FIG. 17 may be configured to perform some or all of the functions in the method embodiments described in FIG. 13. Detailed descriptions of the units are as follows:

A service response unit 1701 is configured to return, in response to a service request of a terminal device, a page of a target cloud game video to the terminal device, the page of the target cloud game video including N interaction triggering marks of a target cloud game, an $i^{th}$ interaction triggering mark in the N interaction triggering marks being used for linking to a game progress in the target cloud game, both i and N being positive integers, and $i \leq N$; and a processing unit 1702 is configured to: when the terminal device selects the $i^{th}$ interaction triggering mark and transmits a trial play request, start the target cloud game, and return a game page of the target cloud game to the terminal device starting from the game progress linked by the $i^{th}$ interaction triggering mark.

In one embodiment, the processing unit 1702 is further configured to:

when a trial play exit request transmitted by the terminal device is received, generate a control cloud video, and transmit a cloud clipping page to the terminal device;

according to an operation of the terminal device in the cloud clipping page, cut a selected video clip from the control cloud video and obtain comment information; and in response to a release request of the terminal device, generate a cloud comment according to the selected video clip and the comment information, and return the cloud comment to the terminal device.

Based on the same inventive concept, the principle and beneficial effects of the virtual scene interaction apparatus provided in this embodiment of this application for solving problems are similar to the principle and beneficial effects of the virtual scene interaction method in the method embodiments of this application for solving problems, and reference may be made to the principle and beneficial effects of the implementation of the method. For brevity of the description, details are not described herein again.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations. In addition, this embodiment of this application supports cloud clipping; the clipping process occurs in the cloud; and the terminal device does not need to download or record the cloud trial play video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

Figure 18:
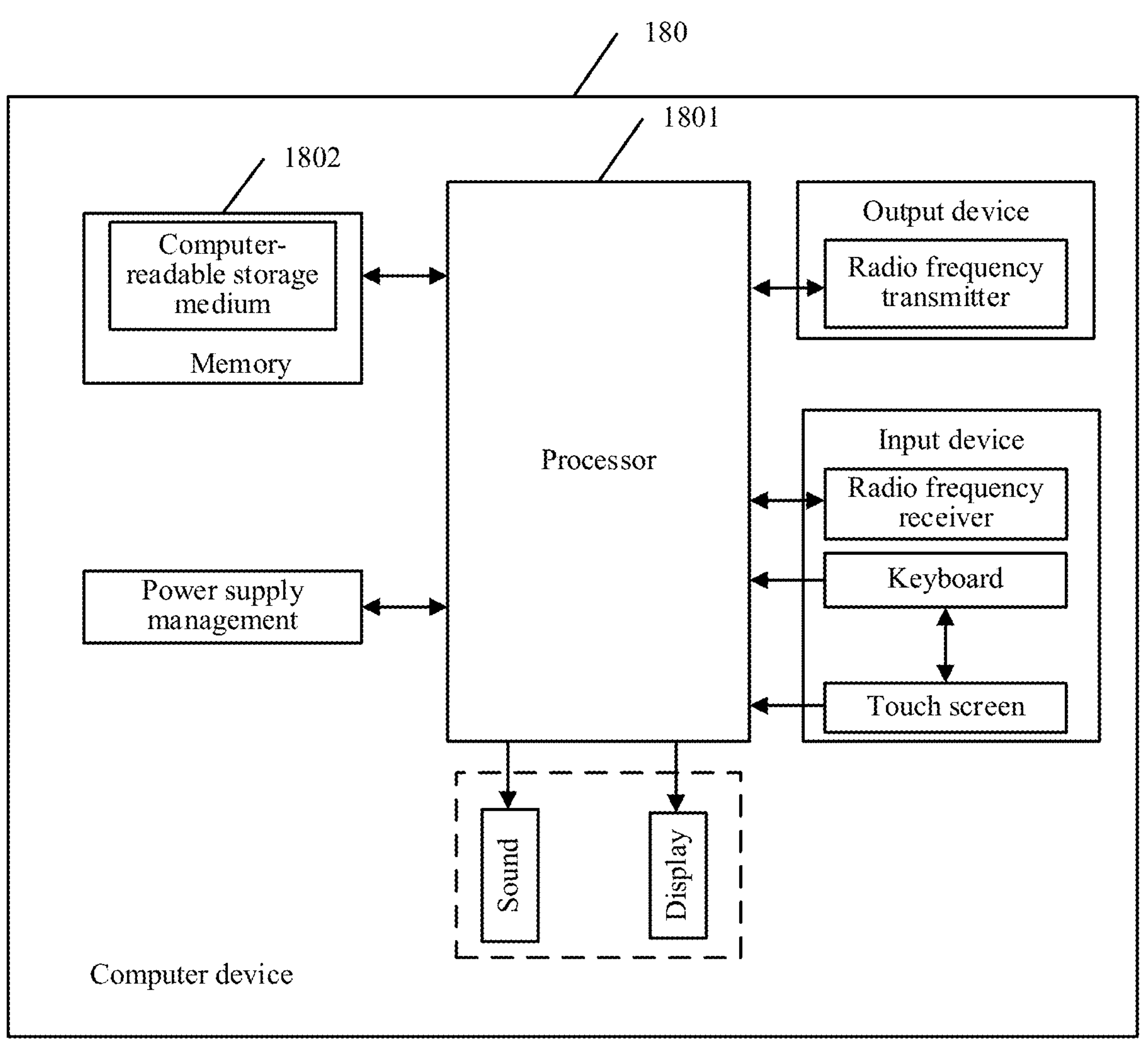
FIG. 18 is a schematic structural diagram of a virtual scene interaction device according to an exemplary embodiment of this application.

FIG. 18 is a schematic structural diagram of a computer device according to an exemplary embodiment of this application. The computer device 180 includes at least a processor 1801 and a computer-readable storage medium 1802. The processor 1801 and the computer-readable storage medium 1802 may be connected by a bus or in another manner. The computer-readable storage medium 1801 may be stored in a memory. The computer-readable storage medium 1801 is configured to store computer-readable instructions, and the processor 1801 is configured to execute the computer-readable instructions stored in the computer-readable storage medium 1802. The processor 1801 (or referred to as a central processing unit (CPU)) is a computing core and a control core of the computer device 180, is suitable for implementing one or more instructions, and is specifically suitable for loading and executing the one or more instructions to implement a corresponding method procedure or a corresponding function.

The embodiments of this application further provide one or more computer-readable storage media (memories), and the one or more computer-readable storage media are a memory device in the computer device 180 and are configured to store computer-readable instructions and data. It may be understood that the computer-readable storage medium 1802 herein may include an internal storage medium of the computer device 180 and certainly may also include an extended storage medium supported by the computer device 180. The computer-readable storage medium provides storage space, and the storage space stores an operating system of the computer device 180. In addition, the storage space further stores one or more instructions suitable for being loaded and executed by the processor 1801. The instructions may be one or more computer-readable instructions (including program code). The computer-readable storage medium 1802 herein may be a high-speed RAM memory, or may be a non-volatile memory, such as at least one magnetic disk storage. In an embodiment, the computer-readable storage medium 1802 may alternatively be at least one computer-readable storage medium that is located away from the processor 1801.

In an embodiment, the computer device 180 may be the terminal device 201 shown in FIG. 2; the computer-readable storage medium 1802 stores computer-readable instructions; and the processor 1801 loads and executes the computer-readable instructions stored in the computer-readable storage medium 1802, to implement the corresponding steps in the virtual scene interaction method shown in the embodiments of this application.

Based on the same inventive concept, the principle and beneficial effects of the virtual scene interaction device provided in this embodiment of this application for solving problems are similar to the principle and beneficial effects of the virtual scene interaction method in the method embodiments of this application for solving problems, and reference may be made to the principle and beneficial effects of the implementation of the method. For brevity of the description, details are not described herein again.

In this embodiment of this application, based on the target cloud game video played in the page of the target cloud game video, the cloud game can be relatively comprehensively displayed in terms of operation skills, game content, and the like, and the player can learn about information of the target cloud game comprehensively, which helps to provide players with more information about the cloud game, thereby improving the efficiency during trial play, and reducing the waste of system resources caused by unnecessary operations. In addition, by means of the solution, any game progress in the cloud game can be entered for trial play operations by using multi-dimensional interaction triggering marks, and it is unnecessary to find a fixed entry through complex operations, thereby avoiding limitations, greatly improving efficiency, reducing operating costs, and avoiding waste of system resources caused by complex operations. In addition, this embodiment of this application supports cloud clipping; the clipping process occurs in the cloud; and the terminal device does not need to download or record the cloud trial play video for local clipping, which reduces requirements on the performance and storage space of the terminal device; and this embodiment further supports visualized cloud comments presented in the form of videos, which improves the expressiveness of comments, thereby being more adapted to the expression requirements of the cloud game scene, and enhancing interactivity between players.

The embodiments of this application further provide a computer-readable instruction product, the computer-readable instruction product, when run on a computer, causing the computer to perform the virtual scene interaction method described in the foregoing method embodiments.

For ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

The steps in the method of the embodiments of this application may be adjusted, combined and deleted in sequence according to an actual requirement.

Modules in the apparatus in the embodiments of this application may be combined, divided, and deleted according to an actual requirement.

A person of ordinary skill in the art can understand that all or some of the steps of the methods in the foregoing embodiments can be implemented by computer-readable instructions instructing relevant hardware. The computer-readable instructions may be stored in a computer-readable storage medium, and the readable storage medium may include a flash drive, a read-only memory (ROM), a random access memory (RAM), a magnetic disk, a compact disc, and the like.

The foregoing descriptions are merely exemplary embodiments of this application, and are not intended to limit the scope of this application. A person skilled in the art may understand all or some processes of the foregoing embodiments, and equivalent modifications made according to the claims of this application shall still fall within the scope of the present disclosure.

What is claimed is:

1. A virtual scene interaction method, performed by a computer device, the method comprising:

displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to a game page of an interaction progress point in the virtual scene, both i and N being positive integers, and i≤N;

displaying, during playing of the target cloud video in a play window of the viewing page, a first bullet comment in the play window, the first bullet comment being a comment released for a first cloud trial play video generated based on a control performed on the game page; and playing the cloud trial play video in response to the first bullet comment being selected, the $i^{th}$ interaction triggering mark being presented in a play page of the cloud trial play video.

2. The method according to claim 1, wherein the target cloud video comprises N archives, an $i^{th}$ archive of the N archives being associated with the $i^{th}$ interaction triggering mark.

3. The method according to claim 1, wherein the play window comprises a play progress indicator axis, the $i^{th}$ interaction triggering mark being set on the play progress indicator axis.

4. The method according to claim 2, wherein the play window comprising a play progress indicator axis, the $i^{th}$ archive being corresponding to a play position on the play progress indicator axis; and the method further comprises:

displaying a prompt box of the $i^{th}$ archive in the play window when a progress pointer on the play progress indicator axis points to the play position corresponding to the $i^{th}$ archive, the $i^{th}$ interaction triggering mark being set in the prompt box of the $i^{th}$ archive.

5. The method according to claim 4, further comprising:

closing the prompt box of the $i^{th}$ archive in the play window when the progress pointer on the play progress indicator axis is away from the play position corresponding to the $i^{th}$ archive and a display duration of the prompt box of the $i^{th}$ archive reaches a set duration.

6. The method according to claim 2, wherein the viewing page comprises an archive display region, a key image of the $i^{th}$ archive being displayed in the archive display region, the $i^{th}$ interaction triggering mark being set in the key image of the $i^{th}$ archive.

7. The method according to claim 2, wherein the viewing page comprises an archive display region, the play window comprising a play progress indicator axis, the $i^{th}$ archive being corresponding to a play position in the play progress indicator axis, and a key image of the $i^{th}$ archive being displayed in the archive display region; and when a progress pointer in the play progress indicator axis points to the play position corresponding to the $i^{th}$ archive, the key image of the $i^{th}$ archive in the archive display region is highlighted.

8. The method according to claim 7, wherein that the key image of the $i^{th}$ archive in the archive display region is highlighted comprises at least one of the following processing:

the key image of the $i^{th}$ archive in the archive display region being displayed in a first color, and regions other than the key image of the $i^{th}$ archive being displayed in a second color; and the key image of the $i^{th}$ archive in the archive display region being displayed at a first brightness level, and regions other than the key image of the $i^{th}$ archive being displayed at a second brightness level.

9. The method according to claim 1, further comprising:

displaying, in response to the $i^{th}$ interaction triggering mark being selected, the game page for the virtual scene starting from the interaction progress point linked by the $i^{th}$ interaction triggering mark;

displaying an interaction prompt when the game page is displayed starting from the interaction progress point linked by the $i^{th}$ interaction triggering mark, the interaction prompt comprising a remaining duration and an exit option; and starting countdown from the remaining duration, and stopping displaying the game page when the remaining duration reaches 0; or stopping displaying the game page when the exit option is selected.

10. The method according to claim 9, further comprising:

displaying a cloud clipping page, and playing a second cloud trial play video in the cloud clipping page, the cloud clipping page comprising a selection box and an information input box; and obtaining a selected video clip from the second cloud trial play video by using the selection box, and obtaining comment information by using the information input box, the second cloud trial play video being a video generated according to a received control operation performed based on the game page after displaying the game page starting from the interaction progress point linked by the $i^{th}$ interaction triggering mark to stopping displaying the game page.

11. The method according to claim 10, wherein the cloud clipping page further comprises a release control; the viewing page comprises a play window, the play window being used for playing the target cloud video; and the method further comprises:

displaying a second bullet comment in the play window when the release control is clicked, the second bullet comment being generated according to the selected video clip and the comment information; and playing the selected video clip of the cloud trial play video when the second bullet comment is selected, information of the second bullet comment being further displayed in a playback page of the selected video clip.

12. The method according to claim 11, wherein the information of the second bullet comment comprises at least one of the following: an identifier of a publisher, an identifier of the second cloud trial play video, an identifier of the selected video clip, an identifier of an $i^{th}$ archive corresponding to the second cloud trial play video, a release time, and an attention level.

13. The method according to claim 1, further comprising:

displaying a cloud service page, a cloud video list being displayed in the cloud service page, the cloud video list comprising at least one cloud video; and displaying, when the target cloud video in the cloud video list is selected, a viewing page of the target cloud video.

14. The method according to claim 1, further comprising:

displaying, in response to the $i^{th}$ interaction triggering mark being selected, the game page for the virtual scene starting from the interaction progress point linked by the $i^{th}$ interaction triggering mark.

15. A virtual scene interaction apparatus, comprising:

one or more processors, configured to execute computer-readable instructions; and a non-transitory computer-readable storage medium, storing computer-readable instructions, the computer-readable instructions, when executed by the one or more processors, implementing a plurality of operations comprising:

displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to a game page of an interaction progress point in the virtual scene, both i and N being positive integers, and i≤N;

displaying, during playing of the target cloud video in a play window of the viewing page, a first bullet comment in the play window, the first bullet comment being a comment released for a first cloud trial play video generated based on a control performed on the game page; and playing the cloud trial play video in response to the first bullet comment being selected, the $i^{th}$ interaction triggering mark being presented in a play page of the cloud trial play video.

16. The apparatus according to claim 15, wherein the target cloud video comprises N archives, an $i^{th}$ archive of the N archives being associated with the $i^{th}$ interaction triggering mark.

17. One or more non-transitory computer-readable storage media, storing computer-readable instructions, the computer-readable instructions, when executed by one or more processors, implementing a virtual scene interaction method, the method comprising:

displaying a viewing page of a target cloud video, a play screen of a virtual scene being displayed in the target cloud video, the viewing page comprising N interaction triggering marks, an $i^{th}$ interaction triggering mark of the N interaction triggering marks being used for linking to a game page of an interaction progress point in the virtual scene, both i and N being positive integers, and i≤N;

displaying, during playing of the target cloud video in a play window of the viewing page, a first bullet comment in the play window, the first bullet comment being a comment released for a first cloud trial play video generated based on a control performed on the game page; and playing the cloud trial play video in response to the first bullet comment being selected, the $i^{th}$ interaction triggering mark being presented in a play page of the cloud trial play video.

18. The one or more non-transitory computer-readable storage media according to claim 17, wherein the target cloud video comprises N archives, an $i^{th}$ archive of the N archives being associated with the $i^{th}$ interaction triggering mark.

19. The one or more non-transitory computer-readable storage media according to claim 17, wherein the play window comprises a play progress indicator axis, the $i^{th}$ interaction triggering mark being set on the play progress indicator axis.

20. The one or more non-transitory computer-readable storage media according to claim 18, wherein the play window comprising a play progress indicator axis, the $i^{th}$ archive being corresponding to a play position on the play progress indicator axis; and the method further comprises:

displaying a prompt box of the $i^{th}$ archive in the play window when a progress pointer on the play progress indicator axis points to the play position corresponding to the $i^{th}$ archive, the $i^{th}$ interaction triggering mark being set in the prompt box of the $i^{th}$ archive.

* * * * *